(12) United States Patent
Igarashi et al.

(10) Patent No.: US 12,024,532 B2
(45) Date of Patent: *Jul. 2, 2024

(54) SILANOL COMPOUND AND METHOD FOR PRODUCING SILANOL COMPOUND

(71) Applicant: National Institute of Advanced Industrial Science and Technology, Tokyo (JP)

(72) Inventors: Masayasu Igarashi, Tsukuba (JP); Kazuhiko Sato, Tsukuba (JP); Fujio Yagihashi, Tsukuba (JP); Tomohiro Matsumoto, Tsukuba (JP); Takeshi Nozawa, Tsukuba (JP); Shigeru Shimada, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/472,421

(22) Filed: Sep. 10, 2021

(65) Prior Publication Data

US 2022/0056056 A1 Feb. 24, 2022

Related U.S. Application Data

(62) Division of application No. 16/606,487, filed as application No. PCT/JP2018/008434 on Mar. 5, 2018, now abandoned.

(30) Foreign Application Priority Data

Apr. 20, 2017 (JP) ................................. 2017-083845

(51) Int. Cl.
  *C07F 7/08* (2006.01)
  *C07F 7/21* (2006.01)
(52) U.S. Cl.
  CPC .............. *C07F 7/0836* (2013.01); *C07F 7/21* (2013.01)
(58) Field of Classification Search
  CPC ............. C07F 7/02; C07F 7/0836; C07F 7/21
  See application file for complete search history.

(56) References Cited

U.S. PATENT DOCUMENTS

| 5,391,546 A | 2/1995 | Le Ribault | |
| 2005/0239985 A1* | 10/2005 | Lichtenhan | C08G 77/08 528/15 |
| 2015/0224473 A1 | 8/2015 | Skinley et al. | |

FOREIGN PATENT DOCUMENTS

| CN | 105960281 A | 9/2016 |
| GB | 1388330 A | 3/1975 |
| JP | S48-049915 A | 7/1973 |
| JP | 2000-319285 A | 11/2000 |
| JP | 2002-363287 A | 12/2002 |
| JP | 2014-169402 A | 9/2014 |
| WO | 2015/115664 A1 | 8/2015 |
| WO | 2015/118105 A1 | 8/2015 |
| WO | 2015/128496 A1 | 9/2015 |
| WO | 2017/018543 A1 | 2/2017 |
| WO | 2017/018544 A1 | 2/2017 |
| WO | 2017/065311 A1 | 4/2017 |
| WO | 2017/097550 A1 | 6/2017 |
| WO | 2018/193732 A1 | 10/2018 |

OTHER PUBLICATIONS

Takeshi (Chem. Lett. 2018, 47, 1530-1533).*
International Search Report for PCT/JP2018/008434, dated Aug. 14, 2018, and English Translation submitted herewith (8 pages).
Cho, Herman et al., "Solution State Structure Determination of Silicate Oligomers by 29Si NMR Spectroscopy and Molecular Modeling," Journal of the American Chemical Society, 2006, vol. 128, No. 7, 2324-2335.
Fyfe, Colin A. et al., "A Kinetic Analysis of the Initial Stages of the Sol-Gel Reactions of Methyltriethoxysilane (MTES) and a Mixed MTES/Tetraethoxysilane System by High-Resolution 29Si NMR Spectroscopy," Journal of Physical Chemistry B, 1997, vol. 101, No. 46, pp. 9504-9509.
Hyde, J. Franklin et al., "Sodium and Potassium Salts of Triorganosilanols," Journal of the American Chemical Society, 1953, vol. 75, pp. 5615-5618.
Kim, Youngbaek et al., "Fabrication of Discreet Materials by Interface-Selective Sol-Gel Polymerization," Chemistry Letters, 2002, pp. 992-993.
Kuroda, Kazuyuki et al., "Trimethylsilyl derivatives of monomeric and oligomeric silicic acids extracted in tetrahydrofuran," Journal of Inorganic and Nuclear Chemistry, 1980, vol. 42, pp. 295-296.

(Continued)

*Primary Examiner* — Pancham Bakshi
(74) *Attorney, Agent, or Firm* — Fitch, Even, Tabin & Flannery LLP

(57) ABSTRACT

The present invention provides a method for producing a silanol compound capable of efficiently producing a silanol compound. The method for producing a silanol compound includes a proton exchange step of forming a silanol compound having a structure represented by following formula (c) by reacting a silicate having a structure represented by following formula (a) with an acidic compound having an acid dissociation constant $pK_a$ of $-1$ to $20$ in dimethyl sulfoxide (DMSO).

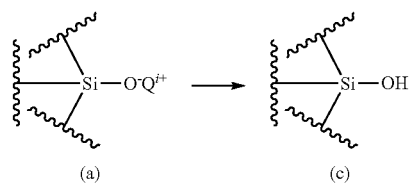

(In formula (a), $Q^{i+}$ represents an i-valent cation and i represents an integer of 1 to 4).

4 Claims, 21 Drawing Sheets

(56) References Cited

OTHER PUBLICATIONS

Laine, Richard M. et al., "Nanobuilding blocks based on the [OSiO1.5]x (x=6, 8, 10) octasilsesquioxanes," Journal of Materials Chemistry, 2005, vol. 15, pp. 3725-3744.

Mateusz, Janeta et al., "Synthesis, characterization and thermal properties of T8 type amido-POSS with p-halophenyl end-group," Journal of Organometallic Chemistry, May 25, 2017, vol. 847, pp. 173-183.

Pramoda, K.P. et al., "Performance Enhancement of Polylactide by Nanoblending With POSS and Graphene Oxide," Polymer Composites, 2014, pp. 118-126.

Smet, Sam et al., "Double-Four-Ring [Si8O12][OH]8 Cyclosilicate and Functionalized Spherosilicate Synthesis from [N(n-C4H9)4]H7[Si8O20]-5.33H2O Cyclosilicate Hydrate Crystals, Chemistry of Materials," Jun. 7, 2017, vol. 29, pp. 5063-5069.

Smet, S., "Synthesis and Characterization of PSS-2: a Second Member of the POSiSil Materials Family," Synthesis and Characterization of Polyoligosiloxysilicones, 2017, pp. 43-62.

International Search Report for PCT/JP2019/041579, dated Dec. 17, 2019, and English Translation submitted herewith (5 pages).

Nozawa, Takeshi et al., "Synthesis, Structure and Reactivity of Cubic Octamer of Orthosilicic acid," Lecture preprints, 98th Spring Annual Meeting of The Chemical Society of Japan, 2018 (1 page).

Pelster, S.A., et al. (Aug. 1, 2007) Detailed Study on the Use of Electrospray Mass Spectrometry To Investigate Speciation in Concentrated Silicate Solutions. Anal. Chem., vol. 79(No. 15), pp. 6005-6012.

Sato et al., "Regular assembly of cage siloxanes by hydrogen bonding of dimethylsilanol groups", Chemical Communications, vol. 51, No. 55 (2015), p. 11034-11037.

* cited by examiner

SILANOL COMPOUND AND METHOD FOR PRODUCING SILANOL COMPOUND

CROSS-REFERENCE TO RELATED APPLICATIONS

This application is a divisional of application Ser. No. 16/606,487, filed Oct. 18, 2019, which is the U.S. national phase application filed under 35 U.S.C. § 371 of International Application Number PCT/JP2018/008434, filed Mar. 5, 2018, designating the United States, which claims priority from Japanese Application Number 2017-083845, filed Apr. 20, 2017.

FIELD OF THE INVENTION

The present invention relates to a silanol compound and a method for producing a silanol compound, and more specifically, to a method for producing a silanol compound, wherein the silanol compound is formed from a silicate.

BACKGROUND OF THE INVENTION

Siloxane is a very important compound that, because of its specific nature, is used in a wide range of fields, such as automobiles, construction, electronics, and medicine. In recent years, siloxane is essential even in the field of environment and energy, such as in sealing materials for LEDs and silane coupling agents for eco-friendly tires. It is no exaggeration to say that there are no fields that do not use siloxane compounds. The market size of siloxane compounds in 2009 was 11.5 billion dollars, with an annual production of 1.23 million tons.

In general, most siloxanes are synthesized via silanol by hydrolysis, such as in a sol-gel method using an alkoxysilane, a halogenated silane or the like as a raw material. This silanol, which includes silanediol, silanetriol and silanetetraol, except for some silanediols and silanetriols having bulky substituents such as phenyl groups, condenses simultaneously with the hydrolysis in the presence of water, and hence it is difficult to synthesize with a good yield. It is also known that silanol is unstable in the presence of water and condenses rapidly (see Non Patent Literature 1 and Non Patent Literature 2).

CITATION LIST

Non Patent Literature

Non Patent Literature 1: Fyfe, C. A.; Aroca, P. P. J. Phys. Chem. B 1997, 101, 9504.
Non Patent Literature 2: Kim, Y.; Jung, E. Chem. Lett. 2002, 992.

SUMMARY OF INVENTION

An object of the present invention is to provide a method for producing a silanol compound capable of efficiently producing a silanol compound.

As a result of intensive studies to solve the above problem, the present inventors discovered that a silanol compound can be efficiently produced by proton exchange of a silicate with an acid compound having an acid dissociation constant $pK_a$ in a specific range, thereby completing the present invention.

The method for producing a silanol compound of the present invention comprises a proton exchange step of forming a silanol compound having a structure represented by following formula (c) by reacting a silicate having a structure represented by following formula (a) with an acidic compound having an acid dissociation constant $pK_a$ of −1 to 20 in dimethyl sulfoxide (DMSO).

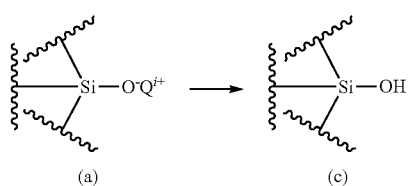

In formula (a), $Q^{i+}$ represents an i-valent cation and i represents an integer of 1 to 4.

The silanol compound of the present invention is represented by following formula (D).

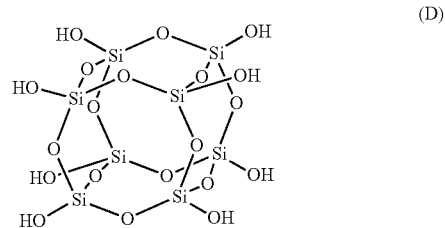 [SMILES: O[Si]12O[Si]3(O)O[Si]4(O)O[Si](O)(O1)O[Si]1(O)O[Si](O)(O2)O[Si](O)(O3)O[Si](O)(O4)O1]

The solid composition of the present invention comprises a silanol compound represented by the above formula (D). The composition of the present invention comprises 30% by mass or more of a silanol compound represented by the above formula (D). Another composition of the present invention comprises a crystal structure formed with a silanol compound represented by the above formula (D) and an amide compound. The dehydrated condensation product of the present invention is obtained by dehydration condensation of a silanol compound represented by the above formula (D).

According to the production method of the present invention, a silanol compound can be produced efficiently. Further, the silanol compound of the present invention, a solid composition and a composition including the silanol compound, and a dehydrated condensation product of the silanol compound are useful as a raw material and the like of a siloxane compound to be used in a wide range of fields.

DESCRIPTION OF EMBODIMENTS

Figure 1:
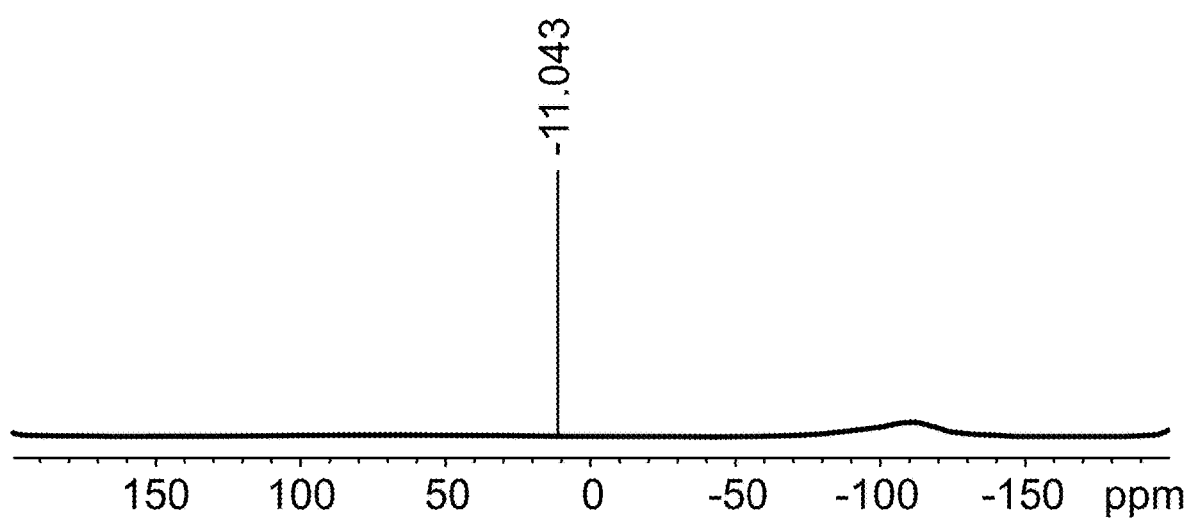
FIG. 1 shows the $^{29}$Si-NMR measurement results of a solution obtained in Example 1.

The present invention is now described in detail by way of specific examples, but the present invention is not limited to the following subject matter and may be appropriately modified and implemented within the gist thereof. It is noted that when a numerical range between two values is represented using the word "to", these two numerical values are also included in the range.

<Method for Producing Silanol Compound>

The method for producing a silanol compound as one embodiment of the present invention (hereinafter sometimes abbreviated as "production method of the present invention") comprises a proton exchange step of forming a silanol compound having a structure represented by following formula (c) (hereinafter sometimes abbreviated as "proton exchange step") by reacting a silicate having a structure represented by following formula (a) (hereinafter sometimes abbreviated as "silicate") with an acidic compound having an acid dissociation constant $pK_a$ of −1 to 20 (hereinafter sometimes abbreviated as "acidic compound") in dimethyl sulfoxide (DMSO) (hereinafter sometimes abbreviated as "$pK_a$ (DMSO)").

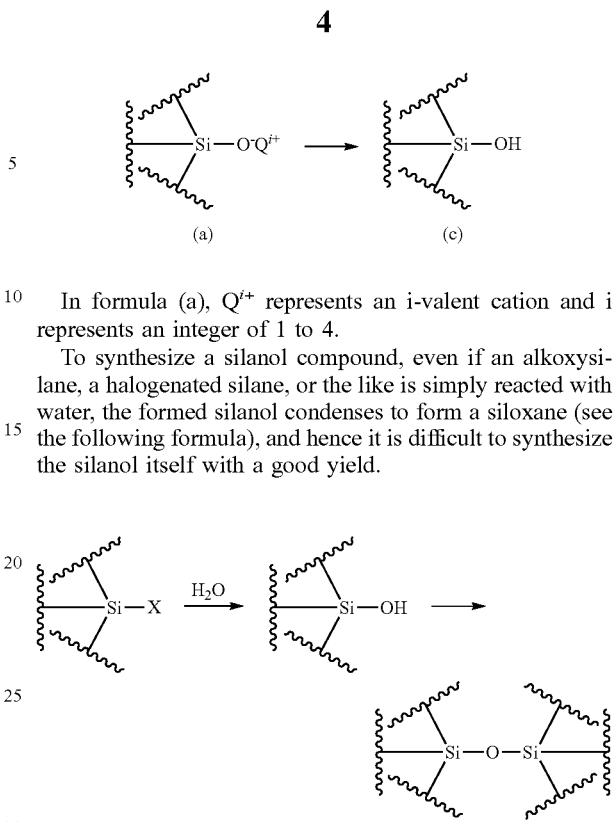

In formula (a), $Q^{i+}$ represents an i-valent cation and i represents an integer of 1 to 4.

To synthesize a silanol compound, even if an alkoxysilane, a halogenated silane, or the like is simply reacted with water, the formed silanol condenses to form a siloxane (see the following formula), and hence it is difficult to synthesize the silanol itself with a good yield.

The present inventors discovered that a silanol compound can be efficiently produced by proton exchange of a silicate having a structure represented by formula (a) with an acidic compound having a $pK_a$ (DMSO) of −1 to 20. When the $pK_a$ (DMSO) is −1 to 20, the exchange of the silicate cations ($Q^{i+}$) and the acidic compound protons ($H^+$) progresses efficiently, and a side reaction and the condensation of the formed silanol compound can be suppressed. For this reason, the silanol compound itself can be synthesized with a good yield. In addition, the production method of the present invention is a production method that is industrially very suitable because the reaction proceeds rapidly under mild conditions. The smaller the $pK_a$ (DMSO) is, the faster the proton exchange step proceeds.

The wavy lines in formula (a) and formula (c) mean that the tip has an arbitrary structure. Therefore, the "silanol compound" may be any compound in which at least one hydroxyl group (—OH) is bonded to a silicon atom (Si), and the number of hydroxyl groups and other structures are not particularly limited. The silanol compound may also include a functional group or the like not involved in the reaction. Further, the $pK_a$ (DMSO) means a known value calculated from the concentration of each component in acid dissociation equilibrium at 25° C. of the acidic compound in DMSO. Specifically, the $pK_a$ (DMSO) is a numerical value obtained by common logarithmizing the value $K_a$ calculated by the following expression.

$$HA \rightleftarrows H^+ + A^-$$

$$K_a = \frac{[H^+][A^-]}{[HA]}$$

Hereinafter, the silicate having a structure represented by formula (a) and the acidic compound having a $pK_a$ (DMSO)

of −1 to 20 in the proton exchange step, as well as the other reaction conditions and the like will be described in detail.

(Proton Exchange Step)

The specific kind of a silicate, the specific kind of an acidic compound, the amount of the acidic compound used, the kind of a reaction medium, which is a solvent or a dispersion medium, the reaction conditions, and the like used in the proton exchange step shown in the following chemical reaction formula are not particularly limited, and can be selected appropriately according to the purpose.

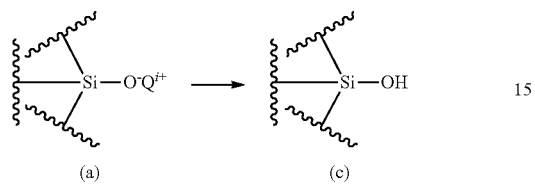

In formula (a), $Q^{i+}$ represents an i-valent cation and i represents an integer of 1 to 4.

It is particularly preferred that i be 1. Examples of $Q^{i+}$ include alkali metal ions such as a lithium ion (Li+), a sodium ion (Na+), and a potassium ion (K+), alkaline earth metal ions such as a magnesium ion ($Mg^{2+}$) and a calcium ion ($Ca^{2+}$), transition metal ions such as an iron(III) ion ($Fe^{3+}$), a copper(II) ion ($Cu^{2+}$), and a zinc ion ($Zn^{2+}$), ammonium ions such as an ammonium ion ($NH_4^+$), a tetramethylammonium ion ($NMe_4^+$), an ethyltrimethylammonium ion ($NEtMe_3^+$), a diethyldimethylammonium ion ($NEt_2Me_2^+$), a triethylmethylammonium ion ($NEt_3Me^+$), a tetraethylammonium ion ($NEt_4^+$), a tetrapropylammonium ion ($NPr_4^+$), and a tetrabutylammonium ion ($NBu_4^+$). Among these, a sodium ion (Na+), a potassium ion (K+), a tetramethylammonium ion ($NMe_4^+$), a tetraethylammonium ion ($NEt_4^+$), and an ethyltrimethylammonium ion ($NEtMe_3^+$) are particularly preferable.

Examples of the silicate include silicates represented by following formulas (A-1) to (A-33).

(A-1)

(A-2)

(A-3)

(A-4)

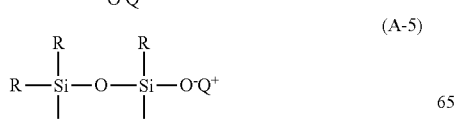
(A-5)

-continued

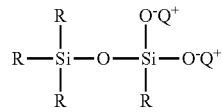
(A-6)

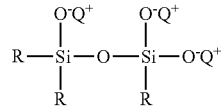
(A-7)

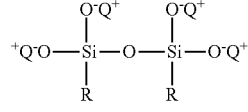
(A-8)

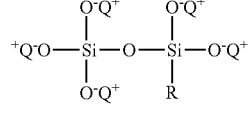
(A-9)

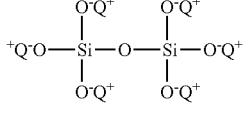
(A-10)

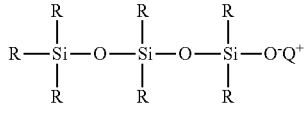
(A-11)

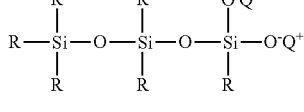
(A-12)

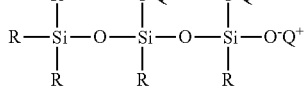
(A-13)

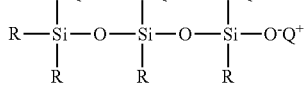
(A-14)

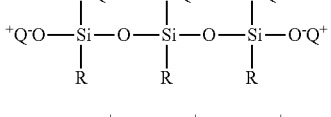
(A-15)

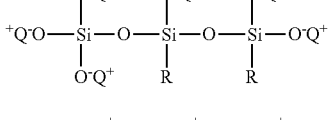
(A-16)

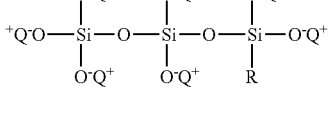
(A-17)

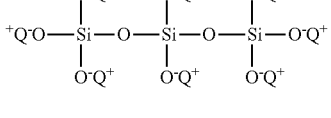
(A-18)

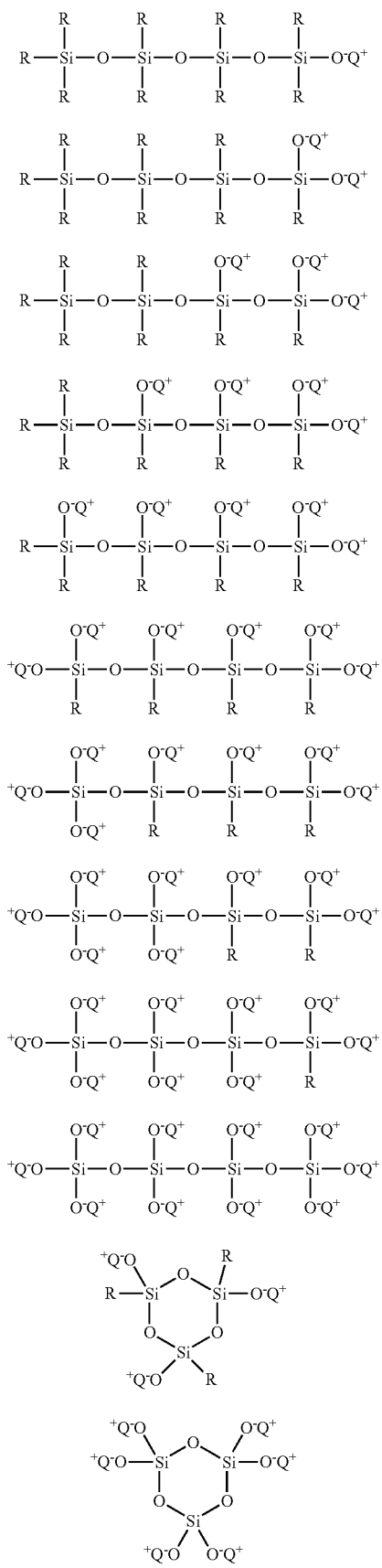

(A-19)
(A-20)
(A-21)
(A-22)
(A-23)
(A-24)
(A-25)
(A-26)
(A-27)
(A-28)
(A-29)
(A-30)

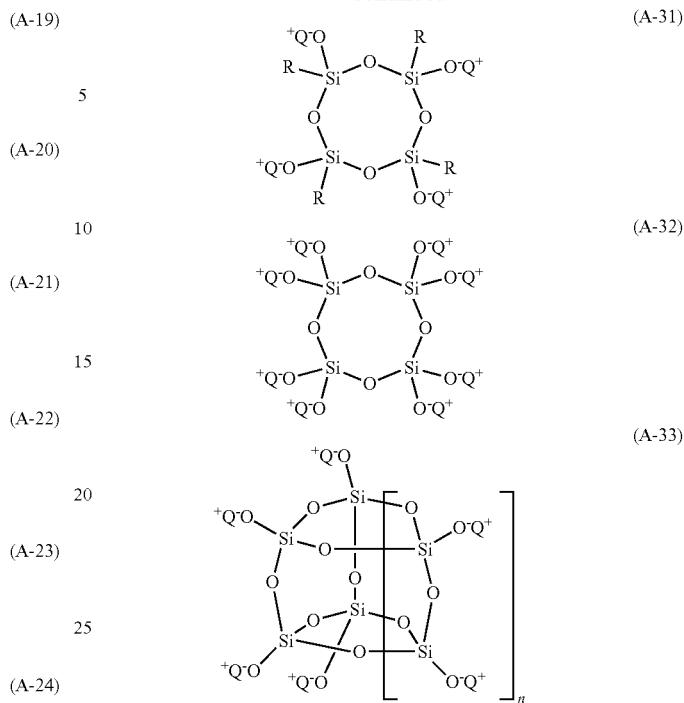

(A-31)
(A-32)
(A-33)

In formulas (A-1) to (A-33), $Q^+$ represents a monovalent cation, each R independently represents a hydrocarbon group having 1 to 20 carbon atoms which may include at least one atom selected from the group consisting of a nitrogen atom, an oxygen atom, and a halogen atom, and n represents an integer of 1 to 4.

Here, "may include at least one atom selected from the group consisting of a nitrogen atom, an oxygen atom, and a halogen atom" not only means a functional group including a nitrogen atom, an oxygen atom, a halogen atom, or the like may be included, this expression also means that a linking group including a nitrogen atom, an oxygen atom, and the like may be included inside or at the end of the carbon skeleton. The "hydrocarbon group" may have a branched structure, a cyclic structure, and a carbon-carbon unsaturated bond (carbon-carbon double bond or carbon-carbon triple bond), respectively, and may be any of a saturated hydrocarbon group, an unsaturated hydrocarbon group, an aromatic hydrocarbon group, and the like.

Examples of the functional group or the linking group included in the hydrocarbon group of R include an amido group (—NHCO—), an ether group (oxa group, —O—), a fluorine atom (fluoro group, —F), a chlorine atom (chloro group, —Cl), a bromine atom (bromo group, —Br), and an iodine atom (iodo group, —I). The hydrocarbon group of R preferably has 1 or more carbon atoms, preferably 14 or fewer carbon atoms, more preferably 10 or fewer carbon atoms, and still more preferably 6 or fewer carbon atoms. When R is an aromatic hydrocarbon group, the number of carbon atoms is usually 6 or more. A silanol compound can be efficiently produced when the number of carbon atoms is in the above range.

Examples of R include a methyl group (-Me), an ethyl group (-Et), a n-propyl group (-$^n$Pr), an i-propyl group (-$^i$Pr), a n-butyl group (-$^n$Bu), a sec-butyl group (-$^s$Bu), a t-butyl group (-$^t$Bu), a phenyl group (-Ph), an aryl group (—Ar), a vinyl group (-Vi), and an allyl group (—CH$_2$CH═CH$_2$).

The acidic compound is a compound having a $pK_a$ (DMSO) of −1 to 20, and preferably, the $pK_a$ (DMSO) is 0 or more, more preferably 1 or more, and still more preferably 3 or more, and is preferably 16 or less, more preferably 14 or less, and still more preferably 8 or less. A silanol compound can be efficiently produced when the $pK_a$ (DMSO) is in the above range. The specific structure and the like of the acidic compound are not particularly limited as long as the $pK_a$ (DMSO) is −1 to 20.

Examples of the acidic compound include inorganic acids such as nitric acid ($pK_a$ (DMSO) of 1.4), sulfuric acid ($pK_a1$ (DMSO) of 1.4 and $pK_a2$ (DMSO) of 14.7), hydrochloric acid ($pK_a$ (DMSO) of 2.1), phosphoric acid ($pK_a1$ (DMSO) of 1.83, $pK_a2$ (DMSO) of 6.43, $pK_a3$ (DMSO) of 11.46), or at least one organic acid selected from the group consisting of acetic acid or compounds having a structure represented by any of the following formulas (b-1) to (b-5).

When a proton exchange reaction using an organic acid is performed in N,N-dimethylacetamide (DMAc), methanol (MeOH) or the like as a reaction medium, the formed ammonium salt is dissolved in the reaction medium. For this reason, it is necessary to separate the ammonium salt, which is a by-product, by column purification or the like. On the other hand, when a proton exchange reaction using an inorganic acid is performed in tetrahydrofuran (THF) or the like as a reaction medium, the formed ammonium salt is not dissolved in the reaction medium. Therefore, the ammonium salt can be separated by simple separation means such as filtration using a filter, and a silanol compound solution as the filtrate can be obtained. Accordingly, the acidic compound is preferably an inorganic acid.

Among inorganic acids, nitric acid, sulfuric acid, hydrochloric acid, and phosphoric acid are preferable, and nitric acid or sulfuric acid is particularly preferable. The reason for this is because nitrate ions, hydrogen sulfate ions, and sulfate ions have weak interactions (hydrogen bonds etc.) with the silanol compound, and the ammonium salt produced as a by-product does not easily form a complex insoluble in the reaction medium with the silanol compound. On the other hand, chloride ions, dihydrogen phosphate ions, hydrogen phosphate ions, and phosphate ions have strong interactions (hydrogen bonds etc.) with the silanol compound, and as a result, in proton exchange using hydrochloric acid or phosphoric acid, the silanol compound and the ammonium salt sometimes form a complex that is insoluble in the reaction medium, which may cause the yield of the desired silanol compound to be slightly reduced.

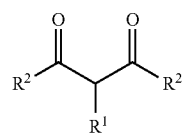

(b-1)

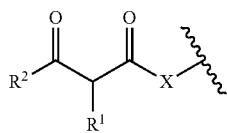

(b-2)

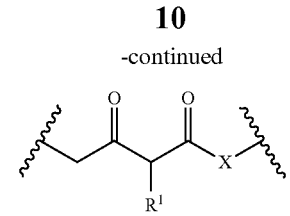

(b-3)

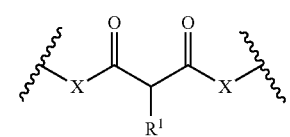

(b-4)

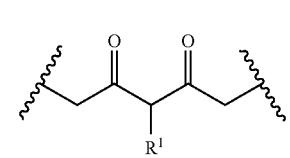

(b-5)

In formulas (b-1) to (b-5), each X independently represents an oxygen atom, a sulfur atom, or an amino group ($—NR^3—$), $R^1$ represents a hydrogen atom or a hydrocarbon group having 1 to 14 carbon atoms, and each $R^2$ independently represents a hydrogen atom or a hydrocarbon group having 1 to 14 carbon atoms.

The wavy lines in formulas (b-2) to (b-5) mean that the tip has an arbitrary structure. For example, the acidic compound may include a functional group or the like not involved in the reaction. Therefore, for example, the acidic compound having the structure represented by formula (b-4) may be a compound including a hydrocarbon group such as a methyl group attached to the oxygen atom corresponding to X, like the dimethyl malonate having the following formula. Further, for example, the acidic compound having the structure represented by formula (b-4) may be a compound in which the hydrocarbon groups attached to the oxygen atoms corresponding to X are bonded to form a cyclic structure, like the Meldrum's acid having the following formula.

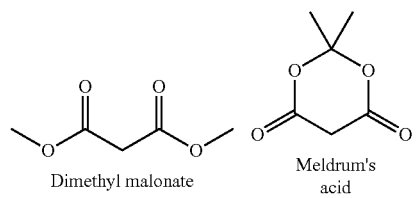

Dimethyl malonate    Meldrum's acid

The structures represented by formulas (b-1) to (b-5) are so-called β-dicarbonyl structures, but the hydrogen of a methylene group sandwiched between the two carbonyl groups, i.e., the α-hydrogen, is known to act as an acid site. By having a structure represented by formulas (b-1) to (b-5), the acid compound exhibits an appropriate acid dissociation constant, and the electrons of the anion formed by the dissociation of protons are delocalized in the structure. For example, for the acidic compound having a structure represented by formula (b-2), the protons dissociate in the manner represented by the following formula. For this reason, it is considered that the acidic compounds having a structure represented by any of formulas (b-1) to (b-5) can suppress the basicity and nucleophilicity of the anion, and a side reaction and condensation of the silanol compound can be effectively suppressed.

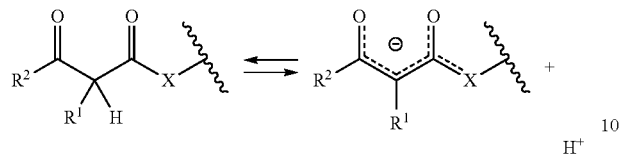

Examples of the amino group (—NR³—) as X include secondary amino groups (—NH—). It is particularly preferred that X be an oxygen atom. When R¹ is a hydrocarbon group, the number of carbon atoms is preferably 6 or less, more preferably 5 or less, and even more preferably 4 or less. Examples of R¹ include a hydrogen atom, a methyl group (-Me), an ethyl group (-Et), a n-propyl group (-$^n$Pr), an i-propyl group (-$^i$Pr), a n-butyl group (-$^n$Bu), and a phenyl group (-Ph), and a hydrogen atom is preferable.

When R² is a hydrocarbon group, the number of carbon atoms is preferably 5 or less, more preferably 4 or less, and even more preferably 3 or less. Examples of R² include a hydrogen atom, a methyl group (-Me), an ethyl group (-Et), a n-propyl group (-$^n$Pr), an i-propyl group (-$^i$Pr), and a n-butyl group (-$^n$Bu), and a hydrogen atom is preferable.

Examples of the acidic compound represented by formula (b-4) include acidic compounds represented by following formula (b-4-1). Examples of the acidic compound represented by formula (b-5) include acidic compounds represented by following formula (b-5-1).

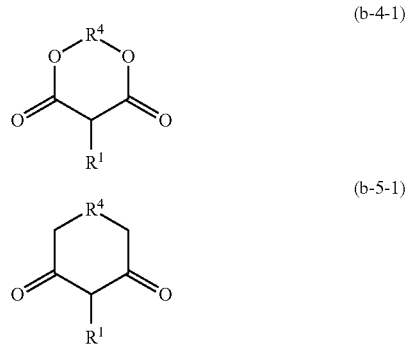

In formulas (b-4-1) and (b-5-1), R¹ represents a hydrogen atom or a hydrocarbon group having 1 to 14 carbon atoms, and R⁴ represents a divalent hydrocarbon group having 1 to 14 carbon atoms.

Examples of R⁴ include a methylene group (—CH₂-), an ethylene group (—CH₂CH₂—), a n-propylene group (—CH₂CH₂CH₂—), a dimethylmethylene group (—C(CH₃)₂—), and an i-propylene group (—CH(CH₃)CH₂—).

Examples of the acidic compound include acetic acid (pK$_a$ (DMSO) of 12.6), benzoic acid (pK$_a$ (DMSO) of 11.1), Meldrum's acid (pK$_a$ (DMSO) of 7.3), a Meldrum's acid derivative, dimedone (pK$_a$ (DMSO) of 11.2), a dimedone derivative, acetylacetone (pK$_a$ (DMSO) of 13.3), and an acetylacetone derivative (see the following formulas)

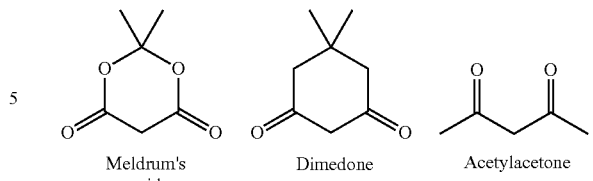

Figure 3:
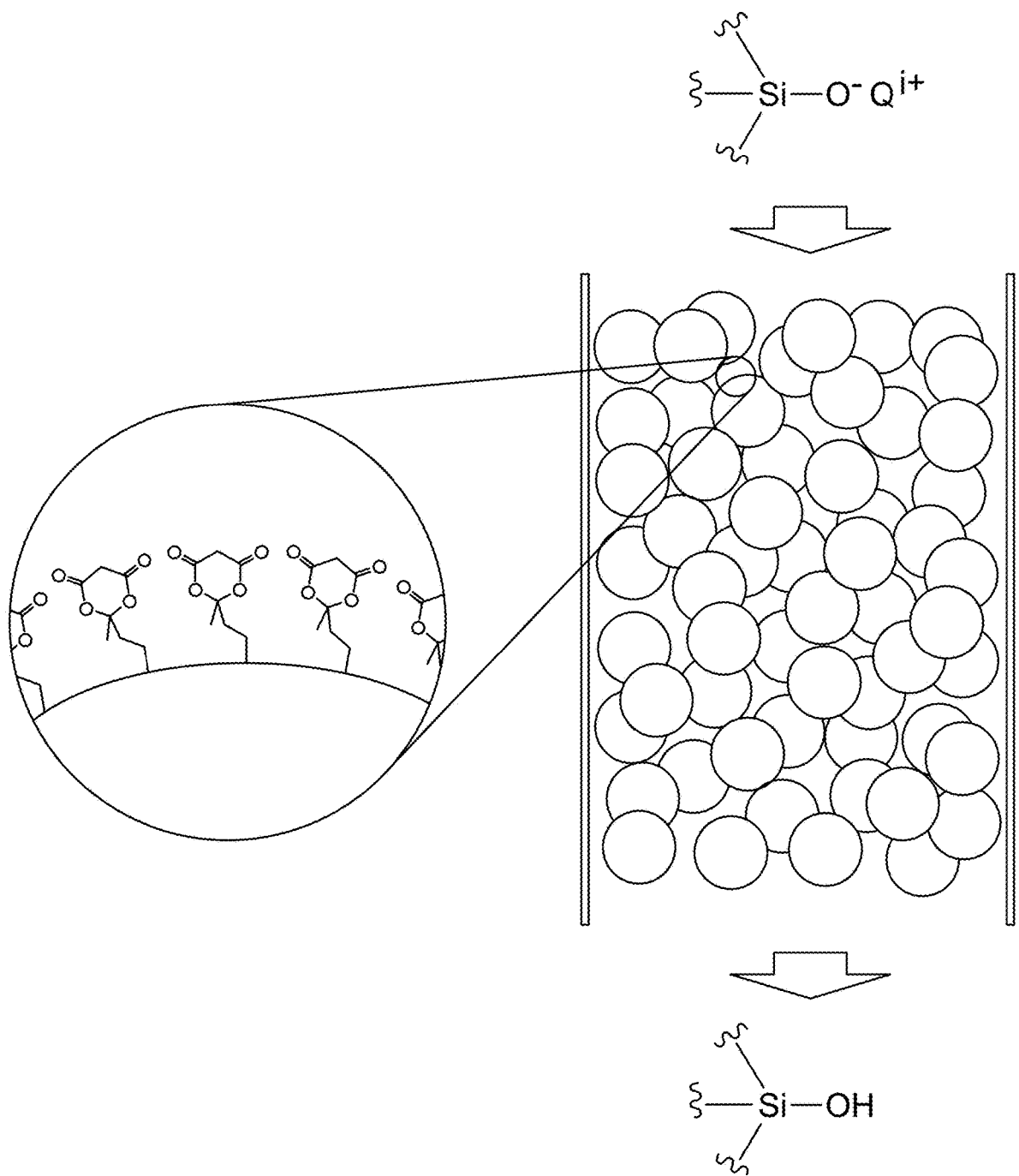
FIG. 3 shows a schematic view illustrating a proton exchange step of forming a silanol compound by passing a silicate having a structure represented by formula (a) through a column packed with a resin having a Meldrum's acid structure.

As the acidic compound, there may be used a solid obtained by introducing a compound represented by any of formulas (b-2) to (b-5) into a low molecular weight compound, such as Meldrum's acid, or an organic solid material, such as a resin, or an inorganic solid material, such as silica or carbon. If the acidic compound is such a solid, the acidic compound can be packed in a column as shown in FIG. 3 and used as an ion exchange resin. This enables the silanol compound to be produced very efficiently.

In particular, the acidic compound is preferably a resin having at least one structure selected from the group consisting of formulas (b-2) to (b-5). It is preferred that the acid compound be capable of being regenerated by exposing to an aqueous acidic solution, such as hydrochloric acid, after the proton exchange step.

The amount of the acidic compound used in the proton exchange step is, in terms of the amount of substance with respect to the silicate, usually 1 times or more, preferably 1.05 times or more, and more preferably 1.1 times or more, and usually 50 times or less, preferably 20 times or less, and more preferably 5 times or less. When the amount used is in the above range, a silanol compound can be efficiently produced.

It is preferable to perform the reaction in the proton exchange step in a liquid. Examples of the liquid include ether liquids such as THF, tetrahydropyran, dioxane, diethyl ether (Et₂O), dimethyl ether, diisopropyl ether, diphenyl ether, methyl ethyl ether, diethylene glycol dimethyl ether, and triethylene glycol dimethyl ether, alcohol liquids such as methanol, ethanol, n-propanol, and i-propanol, amide liquids such as formamide, N,N-dimethylformamide (DMF), acetamide, N-methylacetamide, DMAc, urea, and tetramethylurea, ester liquids such as ethyl acetate, n-amyl acetate, and ethyl lactate, halogen liquids such as methylene chloride, chloroform, carbon tetrachloride, tetrachloroethane, and hexachloroethane, acetone, methyl ethyl ketone, phenyl methyl ketone, DMSO, and water. The liquid is not limited to one kind, and two or more kinds may be combined.

The amount of liquid used in the proton exchange step is preferably such that the content of the silicate is 0.005 to 0.04 mol/L. This is because a silanol compound can be produced efficiently with such a silicate content. The reaction temperature in the proton exchange step is usually −80° C. or more, preferably 0° C. or more, and more preferably 20° C. or more, and is usually 200° C. or less, preferably 70° C. or less, and more preferably 40° C. or less. The reaction time in the proton exchange step is usually 48 hours or less, preferably 24 hours or less, more preferably 8 hours or less, and particularly preferably 1 hour or less. A silanol compound can be efficiently produced when these factors are in the respective ranges above.

The production method of the present invention may include steps other than the proton exchange step. Examples of specific steps other than the proton exchange step include an ammonium salt addition step of adding an ammonium salt to the product obtained in the proton exchange step (hereinafter sometimes abbreviated as "ammonium salt addition step"), a freeze-drying step of freezing the product obtained in the proton exchange step or the product obtained in the ammonium salt addition step and exposing the product to reduced pressure (hereinafter sometimes abbreviated as "freeze-drying step"), and a crystallization step of precipitating crystals from the product obtained in the proton exchange step or the product obtained in the ammonium salt addition step by a poor solvent method or an evaporation method (hereinafter sometimes abbreviated as "crystallization step"). The "ammonium salt addition step", the "freeze-drying step", the "crystallization step" and the like are now described below in detail.

(Ammonium Salt Addition Step)

The kind and amount of the ammonium salt used, and the like are not particularly limited, and can be appropriately selected according to the purpose. In addition, "ammonium salt" means a compound formed with an ammonium ion and a counter anion, and the structures of the ammonium ion and the counter anion are not particularly limited. It is considered that the addition of the ammonium salt suppresses condensation of the silanol compound. Examples of the ammonium ion include a tetrahydroammonium ion ($NH_4^+$), a tetramethylammonium ion ($NMe_4^+$), a tetrapropylammonium ion ($NPr_4^+$), a tetrabutylammonium ion ($NBu_4^+$), a benzyltributylammonium ion ($NBnBu_3^+$), a tributyl(methyl)ammonium ($NBu_3Me^+$) ion, a tetrapentylammonium ion ($NPen_4^+$), a tetrahexylammonium ion ($NHex_4^+$), a tetraheptylammonium ion ($NHep_4^+$), an 1-butyl-1 methylpyrrolidinium ion ($BuMePyr^+$), a methyltrioctylammonium ion ($NMeOct_3^+$), a dimethyldioctadecylammonium ion, and a Meldrum's acid-tetramethylammonium salt.

Examples of the counter anion include a fluoride ion ($F^-$), a chloride ion ($Cl^-$), a bromide ion ($Br^-$), an iodide ion ($I^-$), an acetoxy ion ($AcO^-$), a nitrate ion ($NO_3^-$), an azide ion ($N_3^-$), a tetrafluoroborate ion ($BF_4^-$), a perchlorate ion ($ClO_4^-$), and a hydrogen sulfate ion ($HSO_4^-$).

The ammonium salt is particularly preferably tetrabutylammonium chloride ($NBu_4Cl$), tetrabutylammonium bromide ($NBu_4Br$), tetrapentylammonium chloride ($NPen_4Cl$), a Meldrum's acid-tetramethylammonium salt, or dimethyldioctadecylammonium chloride. The ammonium salt included in the composition is not limited to one kind, and may include two or more kinds. The amount of the ammonium salt used is preferably 1 to 4 times in terms of the amount of substance with respect to the silanol compound.

(Freeze-Drying Step)

The freezing temperature, the drying temperature, the drying pressure, the drying time, and the like in the freeze-drying step are not particularly limited, and can be appropriately selected according to the purpose. The freezing temperature is not particularly limited as long as the product obtained in the proton exchange step or the product obtained in the ammonium salt addition step freezes, but it is usually 10° C. or less, preferably 0° C. or less, and more preferably −20° C. or less, and is usually −196° C. or more, preferably −150° C. or more, and more preferably −100° C. or more.

The drying temperature is usually 10° C. or less, preferably 0° C. or less, and more preferably −20° C. or less, and is usually −196° C. or more, preferably −150° C. or more, and more preferably −100° C. or more. The drying pressure is usually 100 Pa or less, preferably 20 Pa or less, and more preferably 3 Pa or less, and is usually $10^{-5}$ Pa or more, preferably 0.01 Pa or more, more preferably 1 Pa or more. The drying time is usually 200 hours or less, preferably 100 hours or less, and more preferably 50 hours or less, and is usually 1 hour or more, preferably 5 hours or more, and more preferably 10 hours or more.

(Crystallization Step)

The solvent used in the crystallization step, the crystallization time (standing time), and the like are not particularly limited, and can be appropriately selected according to the purpose. The boiling point of the solvent to be used is usually 0° C. or more, preferably 10° C. or more, and more preferably 30° C. or more, and is usually 300° C. or less, preferably 200° C. or less, and more preferably 100° C. or less. Examples of the solvent to be used include $Et_2O$, THF, diethylene glycol dimethyl ether, triethylene glycol dimethyl ether, DMAc, N,N-dimethylformamide, N-methylacetamide, DMSO, and tetramethylurea. The crystallization time (standing time) is usually 720 hours or less, preferably 360 hours or less, and more preferably 168 hours or less, and is usually 1 hour or more, preferably 5 hours or more, and more preferably 10 hours or more.

<Silanol Compound/Solid Composition/Composition/Dehydrated Condensation Product of Silanol Compound>

A silanol compound represented by following formula (D) (hereinafter sometimes abbreviated as "the silanol compound of the present invention"), a solid composition including a silanol compound represented by following formula (D) (hereinafter sometimes abbreviated as "the solid composition of the present invention"), a composition including a silanol compound represented by following formula (D) (hereinafter sometimes abbreviated as "the composition of the present invention") and a dehydrated condensation product of a silanol compound represented by following formula (D) (hereinafter sometimes abbreviated as "the dehydrated condensation product of the present invention"), which can be produced by the production method of the present invention and are useful as a raw material and the like of a siloxane compound, are also embodiments of the present invention.

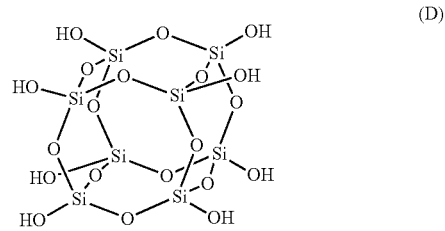 [SMILES: O[Si]12O[Si]3(O)O[Si]4(O)O[Si](O)(O1)O[Si]1(O)O[Si](O)(O2)O[Si](O)(O3)O[Si](O)(O4)O1]

(D)

The kind and the like of a compound other than a silanol compound represented by formula (D) that is included in the solid composition or the composition of the present invention are not particularly limited, and can be appropriately selected according to the purpose. It is also noted that since the silanol compound represented by formula (D) is obtained in a high concentration by the production method of the present invention, the content of the silanol compound represented by formula (D) in the solid composition or the composition of the present invention can be adjusted appropriately. For example, the content of the silanol compound represented by formula (D) in the solid composition or the composition can be 95% by mass or more by evaporating the solvent at about 100° C., at which dehydration condensation does not easily proceed. In addition, even if the solid composition of the present invention is heated at about 100° C., it is known from the results of Raman analysis that the basket-shaped skeletal structure of the silanol compound represented by formula (D) is maintained.

Examples of the compound other than the silanol compound represented by formula (D) include water, an ether compound, an amine compound, an amide compound, and an ammonium salt. The amine compound, the amide compound, and the ammonium salt have an effect of suppressing the condensation of the silanol compound. Moreover, in compositions obtained by a production method utilizing hydrolysis of a halogenated silane, an alkoxysilane, or the like, water tends to be included in those compositions as a result of mixing from the atmosphere or generation by dehydration condensation of the silanol compound. The water content in the composition of the present invention is preferably as small as possible, for the reason that water promotes condensation of the silanol compound and causes a decrease in the stability of the solid composition or the composition of the present invention.

The specific kind of the amine compound is not particularly limited, as long as the amine compound has an amino group (which may be any of a primary amine, a secondary amine, or a tertiary amine). In addition, compounds having both an amino group and an amide group are classified herein as being an "amide compound". Examples of the amine compound include aniline ($NH_2Ph$), diphenylamine ($NHPh_2$), dimethylpyridine ($Me_2Pyr$), di-tert-butylpyridine ($^tBu_2Pyr$), pyrazine (Pyraz), triphenylamine ($NPh_3$), triethylamine ($Et_3N$), and di-isopropylethylamine ($^iPr_2EtN$). Among amine compounds, aniline ($NH_2Ph$) is particularly preferred. The amine compound included in the composition is not limited to one kind, and two or more kinds may be included.

The content (the total content when including two or more kinds) of the amine compound in the solid composition or the composition of the present invention is preferably more than 0.1% by mass, more preferably 1% by mass or more, and even more preferably 10% by mass or more, and is usually less than 95% by mass, preferably 80% by mass or less, more preferably 60% by mass or less, and even more preferably 50% by mass or less.

The specific kind of the amide compound is not particularly limited as long as the amine compound has an amide bond. Examples of the amide compound include compounds represented by following formula (i) or (ii).

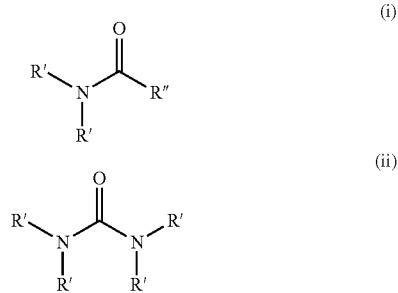

In formulas (i) and (ii), each R' and R" independently represents a hydrogen atom or a hydrocarbon group having 1 to 10 carbon atoms.

Example of R' and R" include a hydrogen atom, a methyl group (-Me), an ethyl group (-Et), a n-propyl group ($-^nPr$), an i-propyl group ($-^iPr$), and a phenyl group (-Ph). Examples of the compound represented by formula (i) include formamide, DMF, acetamide, N-methylacetamide, and DMAc. Examples of the compound represented by formula (ii) include urea, and tetramethylurea ($Me_4Urea$). The content (the total content when including two or more kinds) of the amide compound in the solid composition or the composition of the present invention may be 0% by mass (not contained) or more and 90% by mass or less.

The specific kind of the ammonium salt is not particularly limited, as long as the ammonium salt is a compound formed with an ammonium ion and a counter anion. Examples of the ammonium ion include a tetrahydroammonium ion ($NH_4^+$), a tetramethyl ammonium ion ($NMe_4^+$), a tetraethylammonium ion ($NEt_4^+$), a tetrapropylammonium ion ($NPr_4^+$), a tetrabutylammonium ion ($NBu_4^+$), a benzyltributylammonium ion ($NBnBu_3^+$), a tributyl(methyl)ammonium ($NBu_3Me^+$) ion, a tetrapentylammonium ion ($NPen_4^+$), a tetrahexylammonium ion ($NHex_4^+$), a tetraheptylammonium ion ($NHep_4^+$), an 1-butyl-1 methylpyrrolidinium ion ($BuMePyr^+$), a methyltrioctylammonium ion ($NMeOct_3^+$), a dimethyldioctadecylammonium ion, a hydropyridinium ion ($C_5H_5N^+H$), a hydroanilinium ion ($PhNH_2^-H$), and a Meldrum's acid ion. Further, examples of the counter anion include a fluoride ion ($F^-$), a chloride ion ($Cl^-$), a bromide ion ($Br^-$), an iodide ion ($I^-$), an acetoxy ion ($AcO^-$), a nitrate ion ($NO_3^-$), an azide ion ($N_3^-$), a tetrafluoroborate ion ($BF_4^-$), a perchlorate ion ($ClO_4^-$), and a hydrogen sulfate ion ($HSO_4^-$).

The ammonium salt is particularly preferably tetrabutylammonium chloride ($NBu_4Cl$), tetrabutylammonium bromide ($NBu_4Br$), tetrapentylammonium chloride ($NPen_4Cl$), dimethyldioctadecyl ammonium chloride, or a Meldrum's acid-tetramethylammonium salt. The ammonium salt included in the composition is not limited to one kind, and may include two or more kinds.

The content (the total content when including two or more kinds) of the ammonium salt in the solid composition or the composition of the present invention is preferably more than 0.1% by mass, and more preferably 50% by mass or more, and is usually less than 95% by mass, and preferably 80% by mass or less. Further, the ratio of the ammonium salt to the silanol compound in the solid composition or the composition of the present invention (the total amount of substance of ammonium salt/the total amount of substance of silanol compound) is preferably greater than 0, and more preferably 1 or more, and is usually 8 or less, preferably 6 or less, and more preferably 4 or less.

The dehydrated condensation product of the present invention is a compound formed by dehydration condensation of the hydroxyl group of the silanol compound represented by formula (D), like a dimer or trimer represented by the following formula. The dehydrated condensation product of the present invention is usually a product in which two or more silanol compounds represented by formula (D) are condensed, and is usually a product in which 20 or less, preferably 10 or less, and more preferably 5 or less silanol compounds are condensed. In the above range, the dehydrated condensation product becomes easier to utilize as a raw material and the like of a siloxane compound.

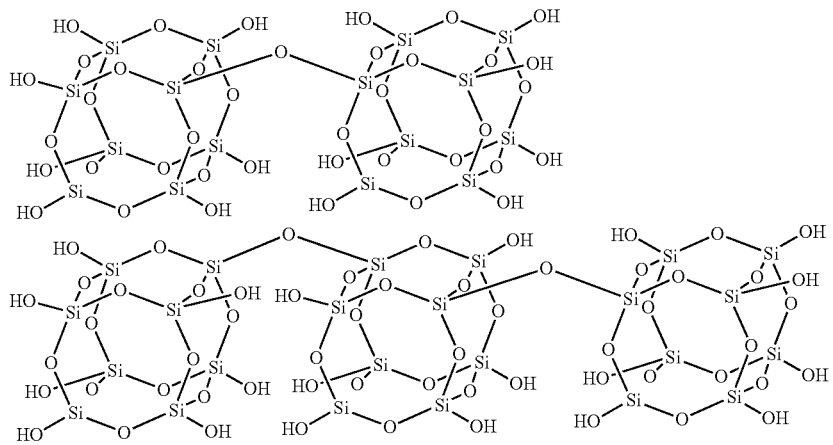

EXAMPLES

The present invention will now be more specifically described with respect to the following examples but it can be modified appropriately without departing from the spirit of the present invention. Accordingly, the scope of the present invention should not be construed as limited by the specific examples shown below.

Example 1

As shown in the following chemical reaction formula, 56.2 mg (0.50 mmol) of sodium trimethylsilanolate ($Me_3SiONa$) and 72.1 mg (0.50 mmol) of Meldrum's acid were placed in a flask, 2 mL of heavy tetrahydrofuran (THF-$d_8$) was charged thereto, and the mixture was stirred for 3 minutes. The $^{29}$Si-NMR (condition: inverse gate decoupling method) of this reaction solution was measured. The results are shown in FIG. 1. It was confirmed by various NMR and mass spectrometry that trimethylsilanol was formed (yield: 99% or more).

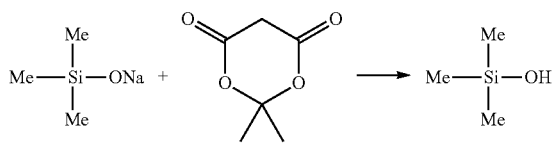

Example 2

24 mg (0.24 mmol) of acetylacetone was placed in a flask, and 0.8 mL of heavy toluene (Tol-$d_8$) was charged thereto. Then, 22 mg (0.20 mmol) of sodium trimethylsilanolate ($Me_3SiONa$) was added, and the mixture was stirred for 30 minutes. Bistrimethylsilylbenzene was added as an internal standard, and it was confirmed by various NMR and mass spectrometry that trimethylsilanol was formed (yield: 76%).

Example 3

A resin represented by chemical formula (E), which was self-made with reference to a previously reported synthesis method (Xian Huang, Zhanxiang Liu, J. Org. Chem. 2002, 67, 6731), was synthesized, and 435 mg of the synthesized resin was packed in a column. A solution of 34 mg (0.30 mmol) of sodium trimethylsilanolate ($Me_3SiONa$) in 1 mL of THF solution was poured in the resin represented by the chemical formula (E) swollen with THF. The solution which flowed out was distilled off and trimethylsilanol was isolated by various NMR and mass spectrometry (yield: 99% or more).

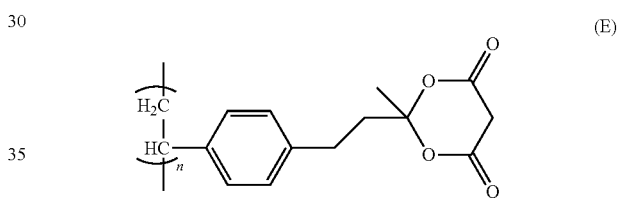

(E)

Example 4

915 mg (equivalent to 5.00 mmol in carboxylic acid units) of acrylic-type DIAION WK40L manufactured by Mitsubishi Chemical and 112 mg (1.00 mmol) of sodium trimethylsilanolate ($Me_3SiONa$) were placed in a flask, and 3 mL of toluene was charged thereto. The mixture was stirred for 30 minutes, after which it was confirmed by various NMR and mass spectrometry of the reaction solution that trimethylsilanol was formed. The yield was calculated by using bistrimethylsilylbenzene as an internal standard (yield: 99% or more).

Example 5

As shown in the following chemical reaction formula, 411 mg (2.85 mmol) of Meldrum's acid was added to a dispersion of 633 mg (0.30 mmol) of octakis(tetramethylammonium)pentacyclo[9.5.1.1$^{3,9}$.1$^{5,15}$.1$^{7,13}$]octasiloxane-1,3,5,7,9,11,13,15-octakis(yloxide)hydrate (CAS No. 69667-29-4 (hereinafter sometimes abbreviated as "$Q_8(TMA)_8 \cdot nH_2O$") suspended in 8 mL of DMAc. The mixture stirred for 10 minutes, and a clear, colorless solution was obtained.

Figure 2A:
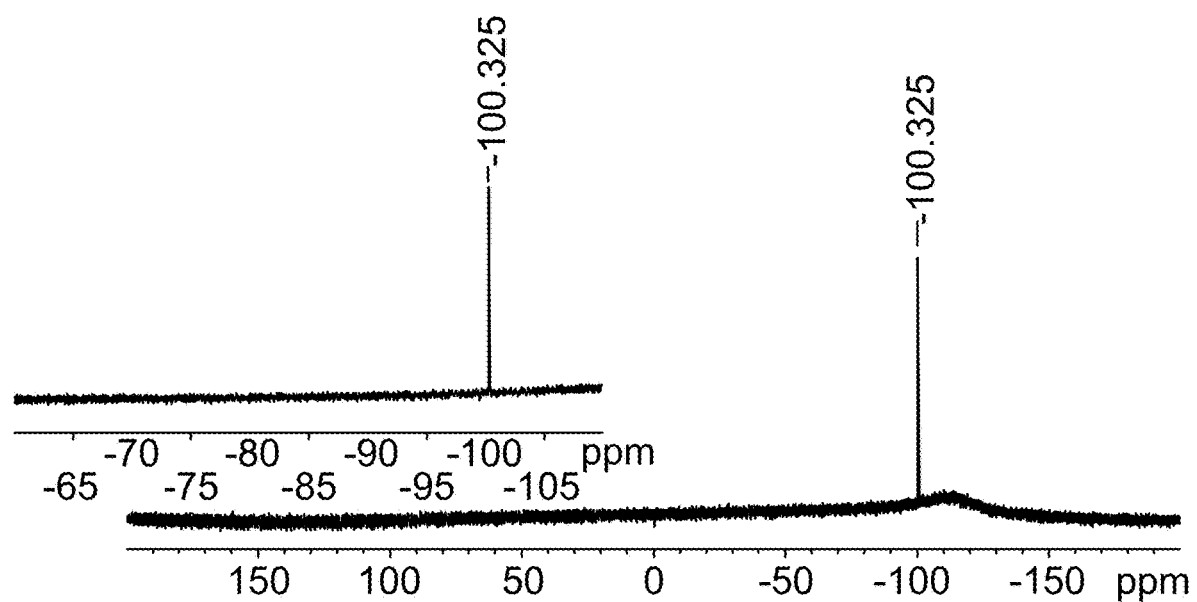
FIG. 2A shows the $^{29}$Si-NMR measurement results of a solution obtained in Example 5.
Figure 2B:
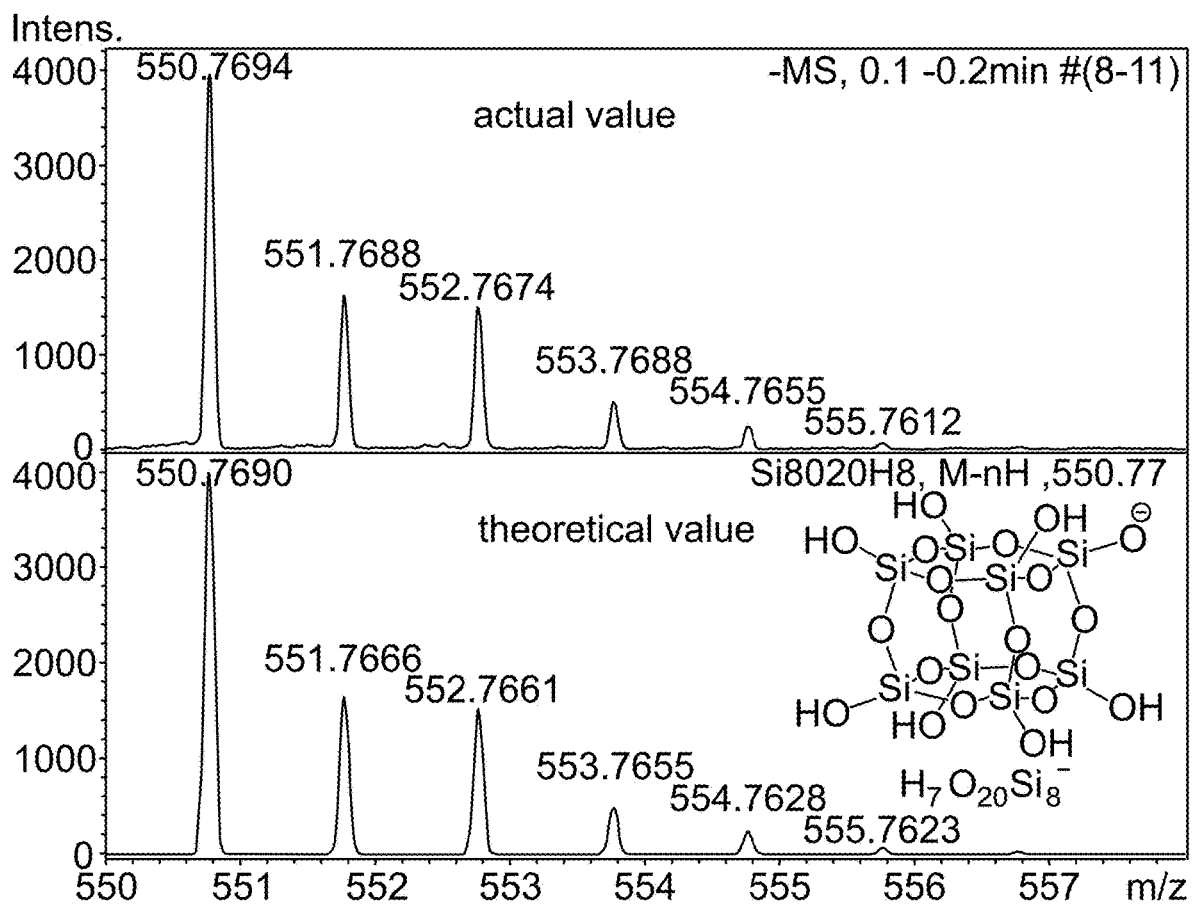
FIG. 2B shows the high-resolution mass spectrometry (TOF-MS) measurement results of the solution obtained in Example 5.

The $^{29}$Si-NMR and the high-resolution mass spectrometry (TOF-MS) of this solution were measured. The results are shown in FIG. 2A and FIG. 2B, respectively. It was confirmed by various NMR, mass spectrometry, and X-ray crystal structure analysis that a proton-exchanged basket-shaped octaol (composition formula $Si_8O_{20}H_8$ (hereinafter sometimes abbreviated as "$Q_8H_8$")) was formed in the solution. The reaction solution was concentrated and the peak portion corresponding to $Q_8H_8$ was collected by GPC.

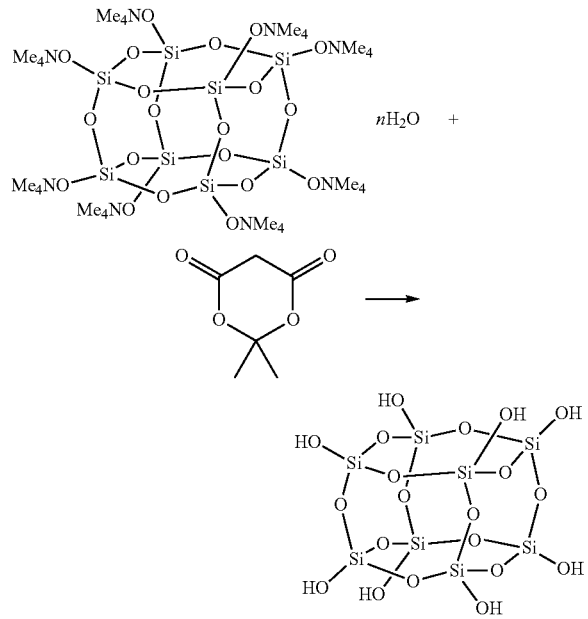

After concentrating the solution including the $Q_8H_8$ and recrystallizing at 2° C. by a poor solvent method, $Q_8H_8$ was successfully isolated as a colorless solid (plate-like crystals) in a yield of 84% (375 mg). In other words, a composition including 37.5% by mass of $Q_8H_8$ was obtained. Further, it was revealed by concentrating the reaction solution and recrystallizing at 2° C. by a poor solvent method that the composition has a crystal structure formed with one molecule of $Q_8H_8$ and 10 molecules of DMAc ($^1$H-NMR (Acetone-$d_6$): 6.44 ppm, $^{29}$Si-NMR (Acetone-$d_6$): −100.2 ppm). In this, a composition having a crystal structure formed with $Q_8H_8$ and an amide compound was obtained.

Example 6

A solution of 171 mg (0.15 mmol) of $Q_8(TMA)_8 \cdot 54H_2O$ dissolved in 0.5 mL of MeOH was added dropwise over 1.5 hours to a solution of 72 mg (1.20 mmol) of acetic acid dissolved in 10 mL of DMAc. It was confirmed by various NMR and mass spectrometry that $Q_8H_8$ was formed.

Example 7

As shown in the following chemical reaction formula, a solution of 28 mg (0.15 mmol) of sodium orthosilicate dissolved in 2 mL of heavy water was added to a solution of 86 mg (0.60 mmol) of Meldrum's acid dissolved in 1 mL of DMAc. This solution was stirred at room temperature for 1.5 hours, and the $^{29}$Si-NMR was measured. It was confirmed by various NMR and mass spectrometry that silanetetraol was formed in a yield of 81%.

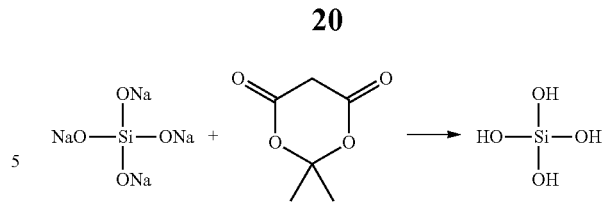

Example 8

As shown in the following chemical reaction formula, a solution of 43 mg (0.30 mmol) of Meldrum's acid dissolved in 0.3 mL of heavy acetone was added to a dispersion of 21 mg (0.10 mmol) of potassium-all-cis-tetramethylcyclotetrasiloxane tetrasilanolate, which was self-made with reference to a previously reported synthesis method (O. I Shchegolikina, Yu. A. Pozdnyakova, A. A. Chetverikov, A. S. Peregudov, M. I. Buzin, E. V. Matukhina, Rus. Chem. Bull., Int. Ed., 2007, 56, 83-90), suspended in 0.3 mL of dimethylacetamide, and the mixture was stirred at room temperature for 10 minutes. It was confirmed by various NMR and mass spectrometry that all-cis-tetramethylcyclotetrasiloxanetetraol was formed. The yield was calculated by using bistrimethylsilylbenzene as an internal standard (yield 87%).

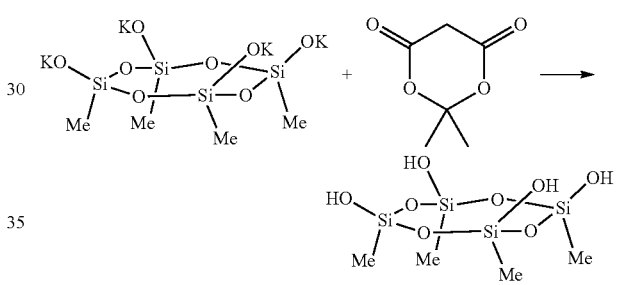

Example 9

121 mg (0.84 mmol) of Meldrum's acid was added to a dispersion of 211 mg (0.10 mmol) of $Q_8(TMA)_8 \cdot 54H_2O$ suspended in 5 mL of DMAc. The mixture was stirred for 5 minutes, a clear, colorless solution including $Q_8H_8$ was obtained. The $^{29}$Si-NMR of this solution was measured. The yield of $Q_8H_8$ was calculated by using bistrimethylsilylbenzene as an internal standard (yield: 94%, $^{29}$Si-NMR (Acetone-$d_6$): −100.6 ppm).

Example 10

77 mg (0.84 mmol) of nitric acid was added to a dispersion of 211 mg (0.10 mmol) of $Q_8(TMA)_8 \cdot 54H_2O$ suspended in 5 mL of DMAc. The mixture was stirred for 15 minutes, and a suspension including $Q_8H_8$ was obtained. This suspension was filtered using a filter, and then the $^{29}$Si-NMR was measured. The yield of $Q_8H_8$ was calculated by using bistrimethylsilylbenzene as an internal standard (yield: 95%, $^{29}$Si-NMR (Acetone-$d_6$): −100.4 ppm).

Example 11

70 μL (0.84 mmol) of hydrochloric acid was added to a dispersion of 211 mg (0.10 mmol) of $Q_8(TMA)_8 \cdot 54H_2O$ suspended in 5 mL of DMAc. The mixture was stirred for 10 minutes, and a suspension including $Q_8H_8$ was obtained. This suspension was filtered using a filter, and then the $^{29}$Si-NMR was measured (yield: 89%, $^{29}$Si-NMR (Acetone-$d_6$): −100.4 ppm).

Example 12

135 mg (0.96 mmol) of dimedone was added to a dispersion of 211 mg (0.10 mmol) of $Q_8(TMA)_8 \cdot 54H_2O$ suspended in 2 mL of DMAc. The mixture was stirred for 5 minutes, and a clear, colorless solution including $Q_8H_8$ was obtained. The $^{29}$Si-NMR of this solution was measured, and the yield of $Q_8H_8$ was calculated (yield: 32%, $^{29}$Si-NMR (Acetone-$d_6$): −101.2 ppm).

Example 13

363 mg (2.52 mmol) of Meldrum's acid was added to a dispersion of 640 mg (0.30 mmol) of $Q_8(TMA)_8 \cdot 55.4H_2O$ (manufactured by Aldrich, product number 522260-5G) suspended in 8 mL of DMAc. The mixture was stirred for 10 minutes, and a clear, colorless solution including $Q_8H_8$ was obtained. The peak portion corresponding to $Q_8H_8$ was collected from the reaction solution by GPC. After concentrating the solution including the $Q_8H_8$ and recrystallizing at 2° C. by a poor solvent method, $Q_8H_8$ was isolated as a colorless solid (white powder), which was a composition including 36.3% by mass of $Q_8H_8$, in a yield of 85% (390 mg) ($^1$H-NMR (THF-$d_8$): 6.30 ppm, $^{29}$Si-NMR (THF-$d_8$): −100.0 ppm).

Example 14

605 mg (4.20 mmol) of Meldrum's acid was added to a dispersion of 1055 mg (0.50 mmol) of $Q_8(TMA)_8 \cdot 54H_2O$ suspended in 20 mL of DMAc. The mixture was stirred for 7 minutes, and a clear, colorless solution was obtained. After adding 200 mL of a mixed solvent of ethanol/acetonitrile (1/1 volume ratio) to this solution, 20 g of anhydrous magnesium sulfate was added thereto, the mixture was stirred for 10 minutes, and then filtered using a filter to obtain a solution. A silica gel column (ethanol/acetonitrile (1/1 volume ratio) mixed solvent as a developing solvent) of this solution was used to collect the peak portion corresponding to $Q_8H_8$. After concentrating the solution including the collected $Q_8H_8$ and recrystallizing at 2° C. by a poor solvent method, a colorless solid, which was a composition including 47% by mass of $Q_8H_8$, was isolated in a yield of 61% (349 mg) ($^{29}$Si-NMR (THF-$d_8$): −100.0 ppm).

Example 15

20 mg of the $Q_8H_8$ composition obtained in Example 5 was dissolved in 1 mL of THF, and trace amounts of insoluble were separated by filtration using a filter. After recrystallizing of this solution at −30° C., a colorless solid (square columnar crystals), which was a composition including 68.4% by mass of $Q_8H_8$, was isolated. Further, it was revealed by single crystal X-ray crystal structure analysis that the obtained crystals had a crystal structure formed with one molecule of $Q_8H_8$, one molecule of DMAc, and two molecules of THF.

Example 16

Figure 4:
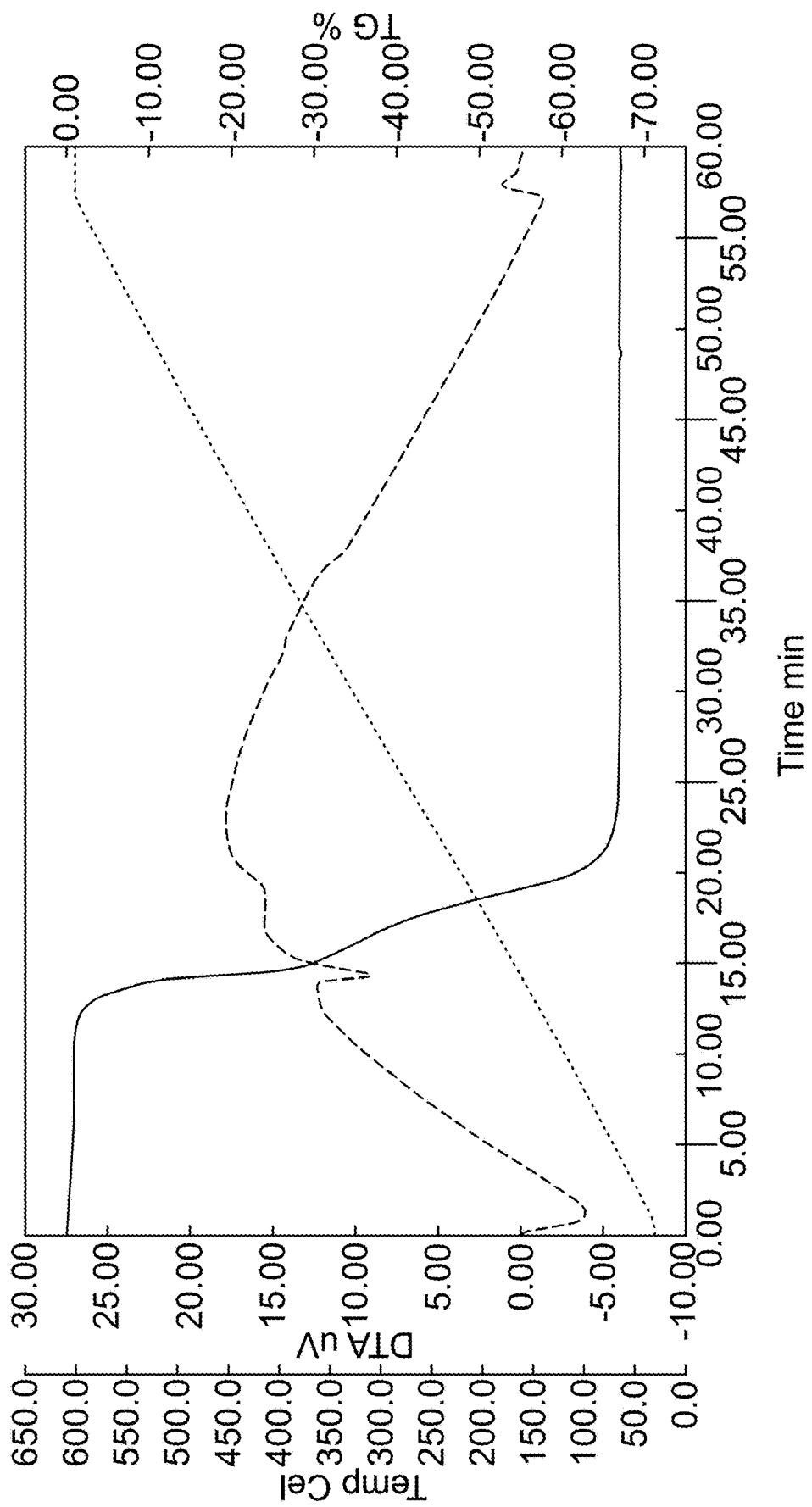
FIG. 4 shows the measurement results of thermogravimetric differential thermal analysis of a solid obtained in Example 16.

141 mg (0.98 mmol) of Meldrum's acid was added to a dispersion of 212 mg (0.10 mmol) of $Q_8(TMA)_8 \cdot 54H_2O$ suspended in 4 mL of DMAc. The mixture was stirred for 10 minutes, and a clear, colorless solution was obtained. 2 mL of THF was gradually added to this solution. The mixture was then left to stand at room temperature, whereby a colorless solid (plate-like crystals), which was a composition including 35.3% by mass of $Q_8H_8$, was isolated in a yield of 94% (147 mg). Further, it was revealed by single crystal X-ray crystal structure analysis that the obtained crystals had a crystal structure formed with one molecule of $Q_8H_8$, four molecules of a Meldrum's acid-tetramethyl ammonium salt, and two molecules of THF. The measurement results of thermogravimetric differential thermal analysis of this solid are shown in FIG. 4. The solid line (-) represents "TG %", the broken line (--) represents "DTA μV", and the dotted line (..) represents "Temp Cel" (the same applies hereinafter).

Example 17

277 mg (1.92 mmol) of Meldrum's acid was added to a dispersion of 423 mg (0.20 mmol) of $Q_8(TMA)_8 \cdot 54H_2O$ suspended in 8 mL of DMAc. The mixture was stirring for 10 minutes, and a clear, colorless solution was obtained. 10 mL of THF and 4.0 g of silica gel (Silica Gel 60, pH 6 (Kanto Chemical)) were added to this solution, and the mixture was stirred for 5 minutes. The silica gel was then separated by filtration using a filter (washed with 10 mL of THF), 2.0 g of silica gel (Silica Gel 60, pH 6 (Kanto Chemical)) was added to the filtrate, and the mixture was stirred for 5 minutes. The silica gel was separated by filtration using a filter (washed with 5 mL of THF). The filtrate was concentrated by distilling under reduced pressure, and recrystallized at −5° C. by a poor solvent method to isolate a colorless solid, which was a composition including 65% by mass of $Q_8H_8$, in a yield of 40% (68 mg) ($^1$H-NMR (THF-$d_8$): 6.29 ppm, $^{29}$Si-NMR (THF-$d_8$): −100.0 ppm).

Example 18

0.141 mL (1.67 mmol) of hydrochloric acid was added to a dispersion of 423 mg (0.20 mmol) of $Q_8(TMA)_8 \cdot 54H_2O$ suspended in 8 mL of DMAc and 2.5 mL of THF. The mixture was stirring for 10 minutes, and a suspension was obtained. This suspension was filtered using a filter (washed with 1 mL of THF), 1.0 g of silica gel (Silica Gel 60, pH 6 (Kanto Chemical)) and 5 mL of THF were then added to the filtrate, and the mixture was stirred for 5 minutes. The silica gel was then separated by filtration using a filter (washed with 7.5 mL of THF). The filtrate was concentrated by distilling under reduced pressure, and recrystallized at −5° C. by a poor solvent method to isolate a colorless solid, which was a composition including 47% by mass of $Q_8H_8$, in a yield of 86% (202 mg) ($^1$H-NMR (Acetone-$d_6$): 6.37 ppm, $^{29}$Si-NMR (Acetone-$d_6$): −100.0 ppm).

Example 19

0.212 mL (3.35 mmol) of nitric acid was added to a dispersion of 845 mg (0.40 mmol) of $Q_8(TMA)_8 \cdot 54H_2O$ suspended in 15 mL of THF and 8 mL of DMAc. The mixture was stirred for 10 minutes, and a suspension was obtained. This suspension was filtered using a filter (washed with 2 mL of THF), 2.0 g of silica gel (Silica Gel 60, pH 6 (Kanto Chemical)) was then added to the filtrate, and the mixture was stirred for 5 minutes. The silica gel was then separated by filtration using a filter (washed with 6 mL of THF). The filtrate was concentrated by distilling under reduced pressure, and recrystallized at −5° C. by a poor solvent method to isolate a colorless solid, which was a composition including 44% by mass of $Q_8H_8$, in a yield of 68% (341 mg) ($^{29}$Si-NMR (Acetone-$d_6$): −100.2 ppm).

Example 20

A colorless solid, which was a composition including 37% by mass of $Q_8H_8$, was isolated in a yield of 72% (429 mg) ($Q_8H_8$) ($^{29}$Si-NMR (Acetone-$d_6$): −100.2 ppm) in the same manner as in Example 19, except that the amount of nitric acid used was changed from 0.212 mL (3.35 mmol) to 0.250 mL (3.95 mmol).

Example 21

2.12 mL (33.5 mmol) of nitric acid was added to a dispersion of 8.062 g (4.00 mmol) of $Q_8(TMA)_8 \cdot 48.7H_2O$ suspended in 150 mL of THF and 80 mL of DMAc. The mixture was stirred for 10 minutes, and a suspension was obtained. This suspension was filtered using a filter (washed with 20 mL of THF), 20.0 g of silica gel (Silica Gel 60, pH 6 (Kanto Chemical)) was then added to the filtrate and the mixture was stirred for 5 minutes. The silica gel was then separated by filtration using a filter (washed with 60 mL of THF). The filtrate was concentrated by distilling under reduced pressure, and recrystallized at −5° C. by a poor solvent method to isolate a colorless solid, which was a composition including 39% by mass of $Q_8H_8$, in a yield of 63% (3.56 g) ($^{29}$Si-NMR (Acetone-$d_6$): −100.2 ppm).

Example 22

A colorless solid, which was a composition including 36% by mass of $Q_8H_8$, was isolated in a yield of 62% (3.851 g) ($^{29}$Si-NMR (Acetone-$d_6$): −100.2 ppm) in the same manner as in Example 21, except that the amount of nitric acid used was changed from 2.12 mL (33.5 mmol) to 2.53 mL (40.0 mmol).

Example 23

0.212 mL (3.35 mmol) of nitric acid was added to a dispersion of 846 mg (0.40 mmol) of $Q_8(TMA)_8 \cdot 54H_2O$ suspended in 20 mL of THF. The mixture was stirred for 5 minutes, and a suspension was obtained. This suspension was filtered using a filter (washed with 5 mL of THF). After adding 8 mL of DMAc to the filtrate, the mixture was concentrated by distilling under reduced pressure, and recrystallized at −5° C. by a poor solvent method to isolate a colorless solid, which was a composition including 43% by mass of $Q_8H_8$, in a yield of 73% (376 mg) ($^{29}$Si-NMR (Acetone-$d_6$): −100.2 ppm).

Example 24

2.12 mL (33.5 mmol) of nitric acid was added to a dispersion of 8.062 g (4.00 mmol) of $Q_8(TMA)_8 \cdot 48.7H_2O$ suspended in 200 mL of THF. The mixture was stirred for 5 minutes, and a suspension was obtained. This suspension was filtered using a filter (washed with 50 mL of THF). After adding 80 mL of DMAc to the filtrate, the mixture was concentrated by distilling under reduced pressure, and recrystallized at −5° C. by a poor solvent method to isolate a colorless solid, which was a composition including 37% by mass of $Q_8H_8$, in a yield of 33% (2.022 g) ($^{29}$Si-NMR (Acetone-$d_6$): −100.2 ppm).

Example 25

A colorless solid, which was a composition including 40% by mass of $Q_8H_8$, was isolated in a yield of 43% (2.427 g) ($^{29}$Si-NMR (Acetone-$d_6$): −100.2 ppm) in the same manner as in Example 24, except that the amount of THF used was changed from 200 mL to 150 mL.

Example 26

A colorless solid, which was a composition including 37% by mass of $Q_8H_8$, was isolated in a yield of 50% (2.988 g) ($^{29}$Si-NMR (Acetone-$d_6$): −100.2 ppm) in the same manner as in Example 24, except that the amount of THF used was changed from 200 mL to 100 mL.

Example 27

A colorless solid, which was a composition including 37% by mass of $Q_8H_8$, was isolated in a yield of 43% (2.552 g) ($^{29}$Si-NMR (Acetone-$d_6$): −100.2 ppm) in the same manner as in Example 24, except that the stirring time was changed from 5 minutes to 30 minutes.

Example 28

A colorless solid, which was a composition including 43% by mass of $Q_8H_8$, was isolated in a yield of 63% (3.237 g) ($^{29}$Si-NMR (Acetone-$d_6$): −100.2 ppm) in the same manner as in Example 25, except that the stirring time was changed from 5 minutes to 30 minutes.

Example 29

A colorless solid, which was a composition including 36% by mass of $Q_8H_8$, was isolated in a yield of 47% (2.872 g) ($^{29}$Si-NMR (Acetone-$d_6$): −100.2 ppm) in the same manner as in Example 27, except that the amount of nitric acid used was changed from 2.12 mL (33.5 mmol) to 2.53 mL (40.0 mmol).

Example 30

A colorless solid, which was a composition including 41% by mass of $Q_8H_8$, was isolated in a yield of 86% (4.717 g) ($^{29}$Si-NMR (Acetone-$d_6$): −100.2 ppm) in the same manner as in Example 27, except that the amount of nitric acid used was changed from 2.12 mL (33.5 mmol) to 3.04 mL (48.0 mmol).

Example 31

Figure 5:
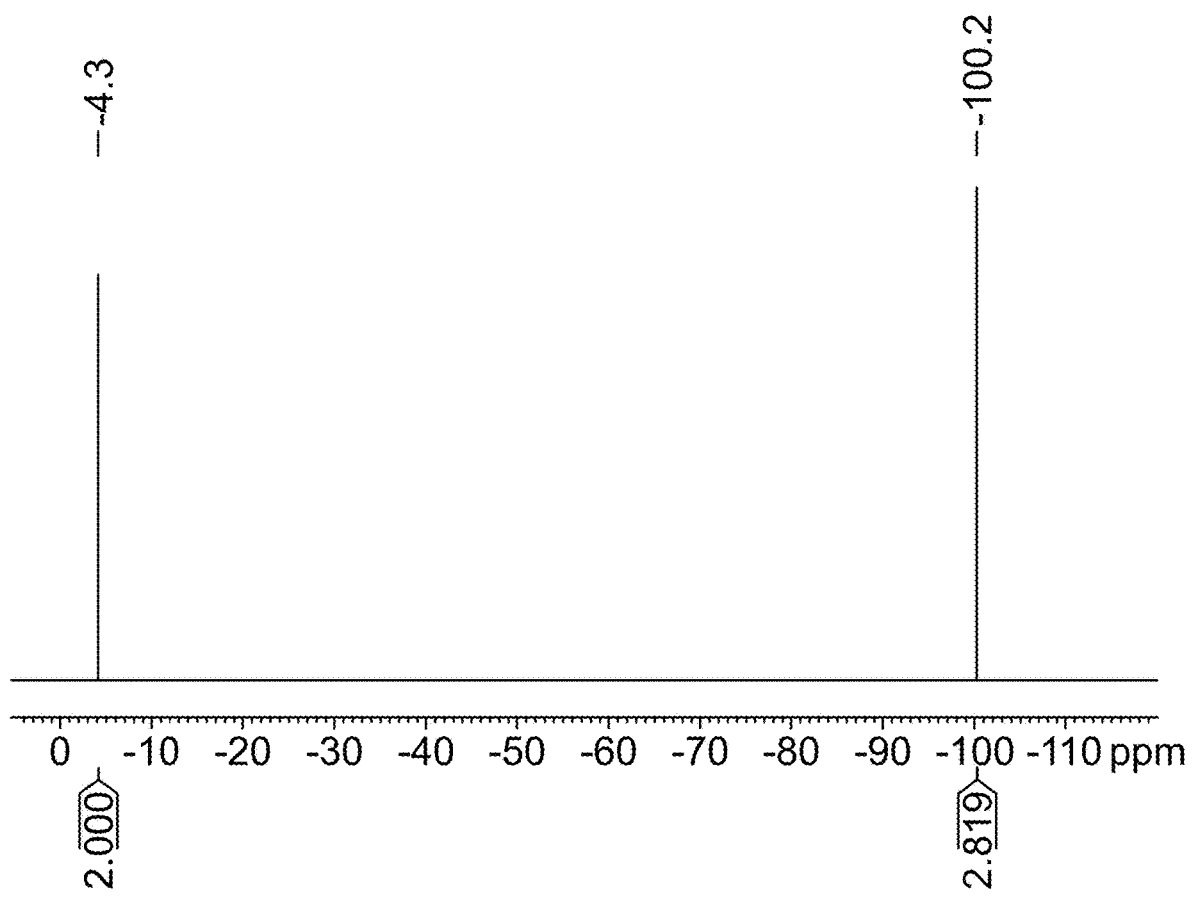
FIG. 5 shows the $^{29}$Si-NMR measurement results of a solution obtained in Example 31.
Figure 6:
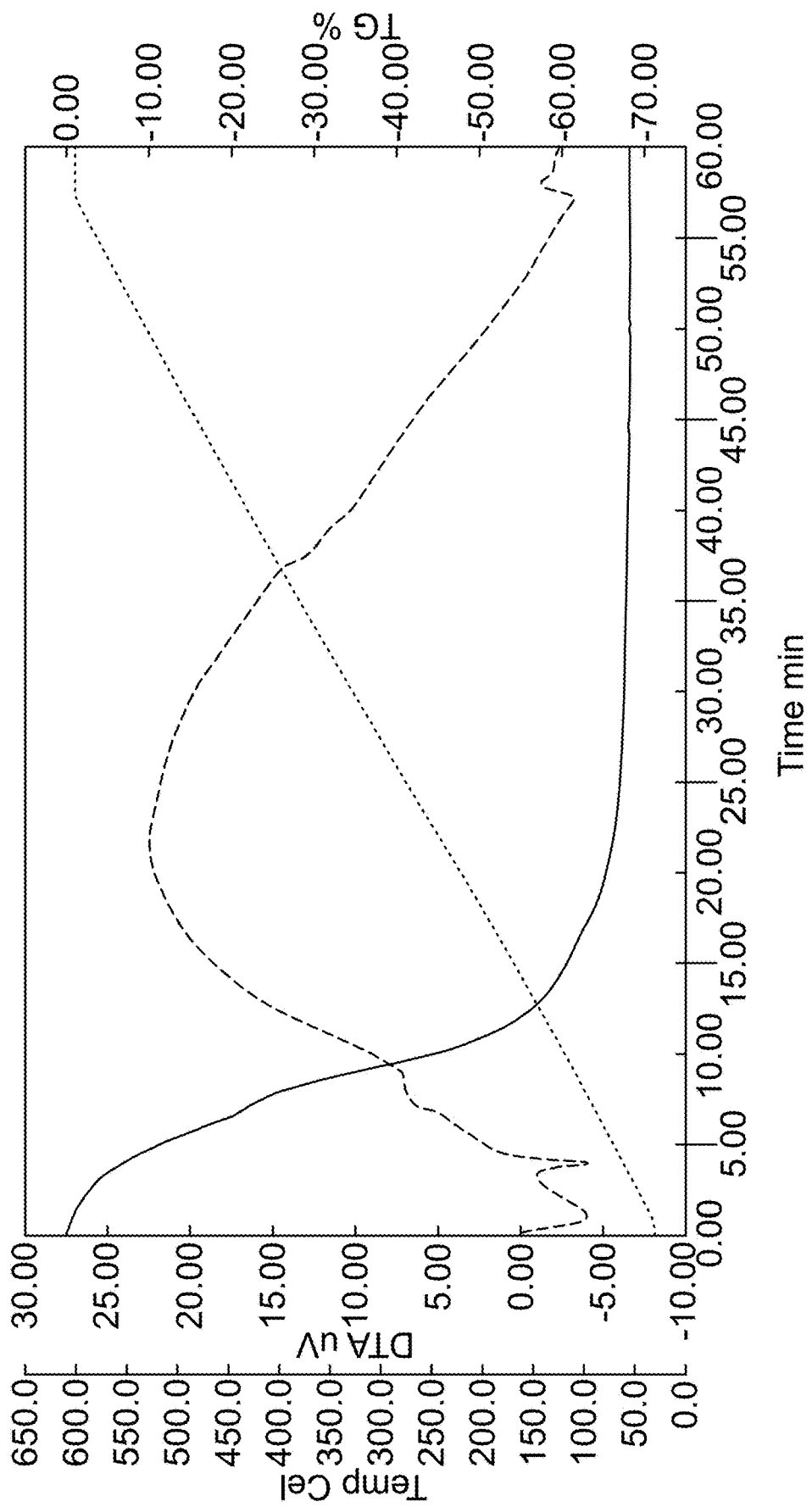
FIG. 6 shows the measurement results of thermogravimetric differential thermal analysis of a solid obtained in Example 31.

A colorless solid, which was a composition including 37% by mass of $Q_8H_8$, was isolated in a yield of 99% (5.889 g) in the same manner as in Example 27, except that the amount of nitric acid used was changed from 2.12 mL (33.5 mmol) to 3.55 mL (56.0 mmol). The $^{29}$Si-NMR measurement results of this solid are shown in FIG. 5 ($^{29}$Si-NMR (Acetone-$d_6$): −100.2 ppm). Further, the measurement results of thermogravimetric differential thermal analysis of this solid are shown in FIG. 6.

Example 32

A colorless solid, which was a composition including 37% by mass of $Q_8H_8$, was isolated in a yield of 85% (5.135 g) ($^{29}$Si-NMR (Acetone-d$_6$): −100.2 ppm) in the same manner as in Example 28, except that the amount of nitric acid used was changed from 2.12 mL (33.5 mmol) to 3.04 mL (48.0 mmol).

Example 33

A colorless solid, which was a composition including 37% by mass of Q$_8$H$_8$, was isolated in a yield of 84% (4.926 g) ($^{29}$Si-NMR (Acetone-d$_6$): −100.1 ppm) in the same manner as in Example 26, except that the amount of nitric acid used was changed from 2.12 mL (33.5 mmol) to 3.04 mL (48.0 mmol).

Example 34

333 mg (3.29 mmol) of sulfuric acid was added to a dispersion of 845 mg (0.40 mmol) of Q$_8$(TMA)$_8$·54H$_2$O suspended in 20 mL of THF. The mixture was stirred for 5 minutes, and a suspension was obtained. This suspension was filtered using a filter (washed with 5 mL of THF). After adding 8 mL of DMAc to the filtrate, the mixture was concentrated by distilling under reduced pressure, and recrystallized at −5° C. by a poor solvent method to isolate a colorless solid, which was a composition including 36% by mass of Q$_8$H$_8$, in a yield of 55% (333 mg) ($^1$H-NMR (Acetone-d$_6$): 7.32 ppm, $^{29}$Si-NMR (Acetone-d$_6$): −100.2 ppm).

Example 35

3.066 g (30.3 mmol) of sulfuric acid was added to a dispersion of 8.062 g (4.00 mmol) of Q$_8$(TMA)$_8$·48.7H$_2$O suspended in 200 mL of THF. The mixture was stirred for 30 minutes, and a suspension was obtained. This suspension was filtered using a filter (washed with 50 mL of THF). After adding 80 mL of DMAc to the filtrate, the mixture was concentrated by distilling under reduced pressure, and recrystallized at −5° C. by a poor solvent method to isolate a colorless solid, which was a composition including 32% by mass of Q$_8$H$_8$, in a yield of 47% (3.294 g) ($^1$H-NMR (Acetone-d$_6$): 6.67 ppm, $^{29}$Si-NMR (Acetone-d$_6$): −100.2 ppm).

Example 36

A colorless solid, which was a composition including 37% by mass of Q$_8$H$_8$, was isolated in a yield of 70% (4.168 g) ($^1$H-NMR (Acetone-d$_6$): 6.67 ppm, $^{29}$Si-NMR (Acetone-d$_6$): −100.2 ppm) in the same manner as in Example 35, except that the amount of sulfuric acid used was changed from 3.066 g (30.3 mmol) to 3.274 g (32.4 mmol).

Example 37

A colorless solid, which was a composition including 39% by mass of Q$_8$H$_8$, was isolated in a yield of 91% (5.099 g) ($^{29}$Si-NMR (Acetone-d$_6$): −100.2 ppm) in the same manner as in Example 35, except that the amount of sulfuric acid used was changed from 3.066 g (30.3 mmol) to 3.492 g (34.5 mmol).

Example 38

A colorless solid, which was a composition including 38% by mass of Q$_8$H$_8$, was isolated in a yield of 87% (5.104 g) ($^{29}$Si-NMR (Acetone-d$_6$): −100.2 ppm) in the same manner as in Example 35, except that the amount of sulfuric acid used was changed from 3.066 g (30.3 mmol) to 3.642 g (36.0 mmol).

Example 39

369 mg (3.20 mmol) of phosphoric acid was added to a dispersion of 845 mg (0.40 mmol) of Q$_8$(TMA)$_8$·54H$_2$O suspended in 20 mL of THF. The mixture was stirred for 5 minutes, and a suspension was obtained. This suspension was filtered using a filter (washed with 5 mL of THF). After adding 8 mL of DMAc to the suspension, the mixture was concentrated by distilling under reduced pressure, and recrystallized at −5° C. by a poor solvent method to isolate a paste-like solid, which was a composition including 11% by mass of Q$_8$H$_8$, in a yield of 7% (143 mg) ($^{29}$Si-NMR (Acetone-d$_6$): −100.2 ppm).

Example 40

0.212 mL (3.35 mmol) of nitric acid was added to a dispersion of 845 mg (0.40 mmol) of Q$_8$(TMA)$_8$·54H$_2$O suspended in 20 mL of THF, and a suspension was obtained by stirring for 5 minutes. This suspension was filtered using a filter (washed with 5 mL of THF). The filtrate was distilled under reduced pressure to isolate a colorless solid, which was a composition including 69% by mass of Q$_8$H$_8$ and 24% by mass of H$_2$O, in a yield of 64% (207 mg) ($^{29}$Si-NMR (MeOD-d$_4$): −100.1 ppm).

Example 41

Figure 7A:
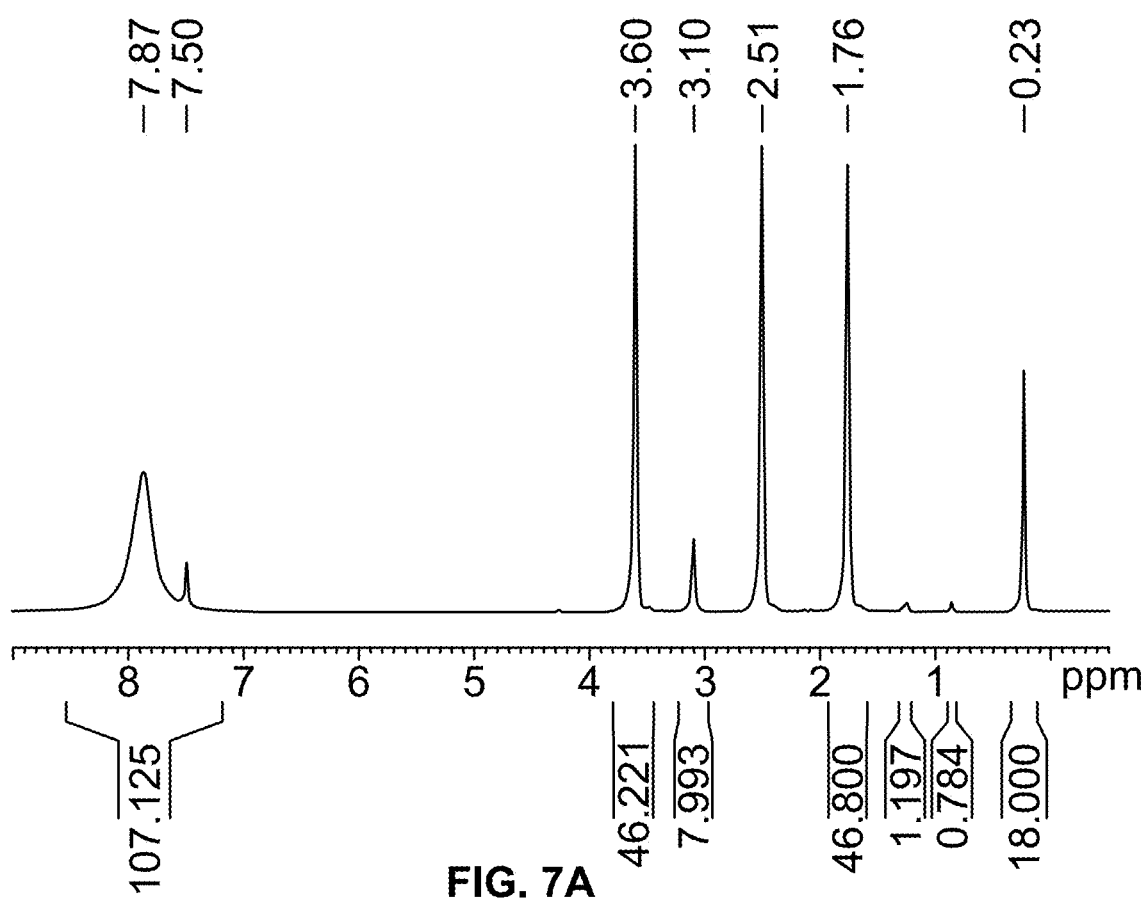
FIG. 7A shows the $^{1}$H-NMR measurement results of a solution of a solid obtained in Example 41.
Figure 7B:
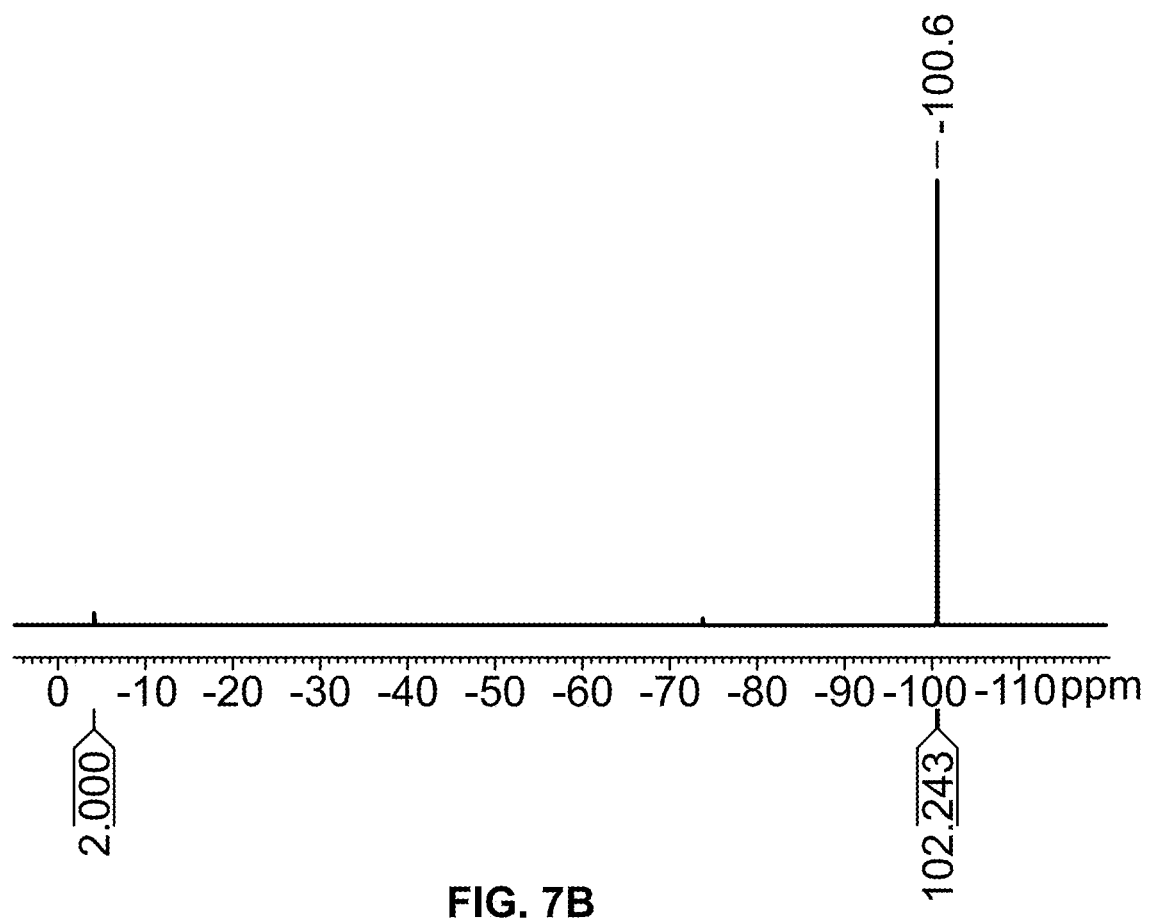
FIG. 7B shows the $^{29}$Si-NMR measurement results of a solution of the solid obtained in Example 41.
Figure 8:
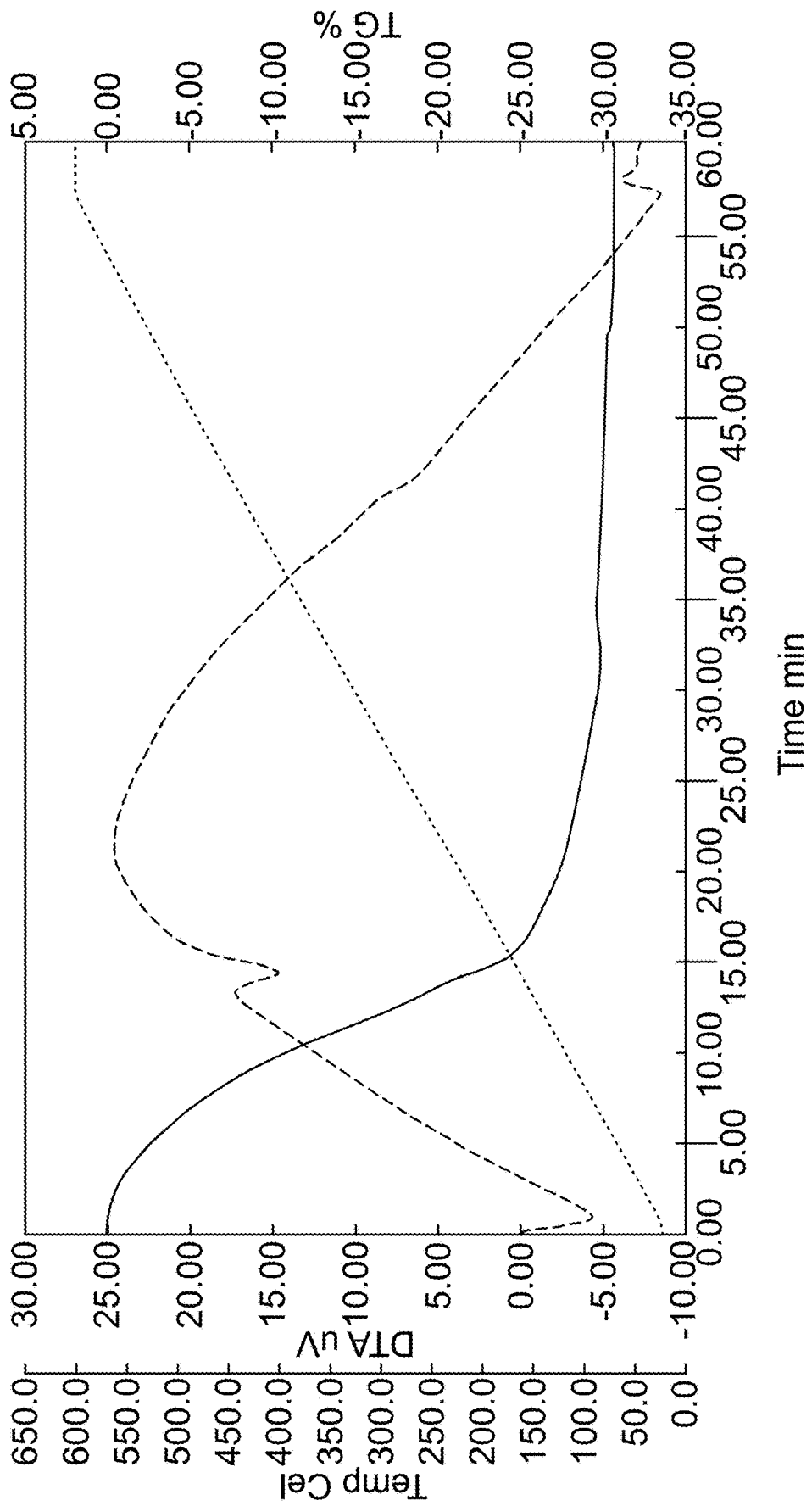
FIG. 8 shows the measurement results of thermogravimetric differential thermal analysis of a solid obtained in Example 41.

3.04 mL (48.0 mmol) of nitric acid was added to a dispersion of 8.062 g (4.00 mmol) of Q$_8$(TMA)$_8$·48.7H$_2$O suspended in 200 mL of THF. The mixture was stirred for 30 minutes, and a suspension was obtained. This suspension was filtered using a filter (washed with 50 mL of THF). The filtrate was distilled under reduced pressure to isolate a colorless solid, which was a composition including 80% by mass of Q$_8$H$_8$ and 1% by mass of H$_2$O, in a yield of 95% (2.493 g). The $^1$H-NMR measurement results of this solid are shown in FIG. 7A ($^1$H-NMR (DMSO-d$_6$): 7.87 ppm). Further, the $^{29}$Si-NMR measurement results of this solid are shown in FIG. 7B ($^{29}$Si-NMR (DMSO-d$_6$): −100.6 ppm). In addition, the measurement results of thermogravimetric differential thermal analysis of this solid are shown in FIG. 8.

Example 42

Figure 9A:
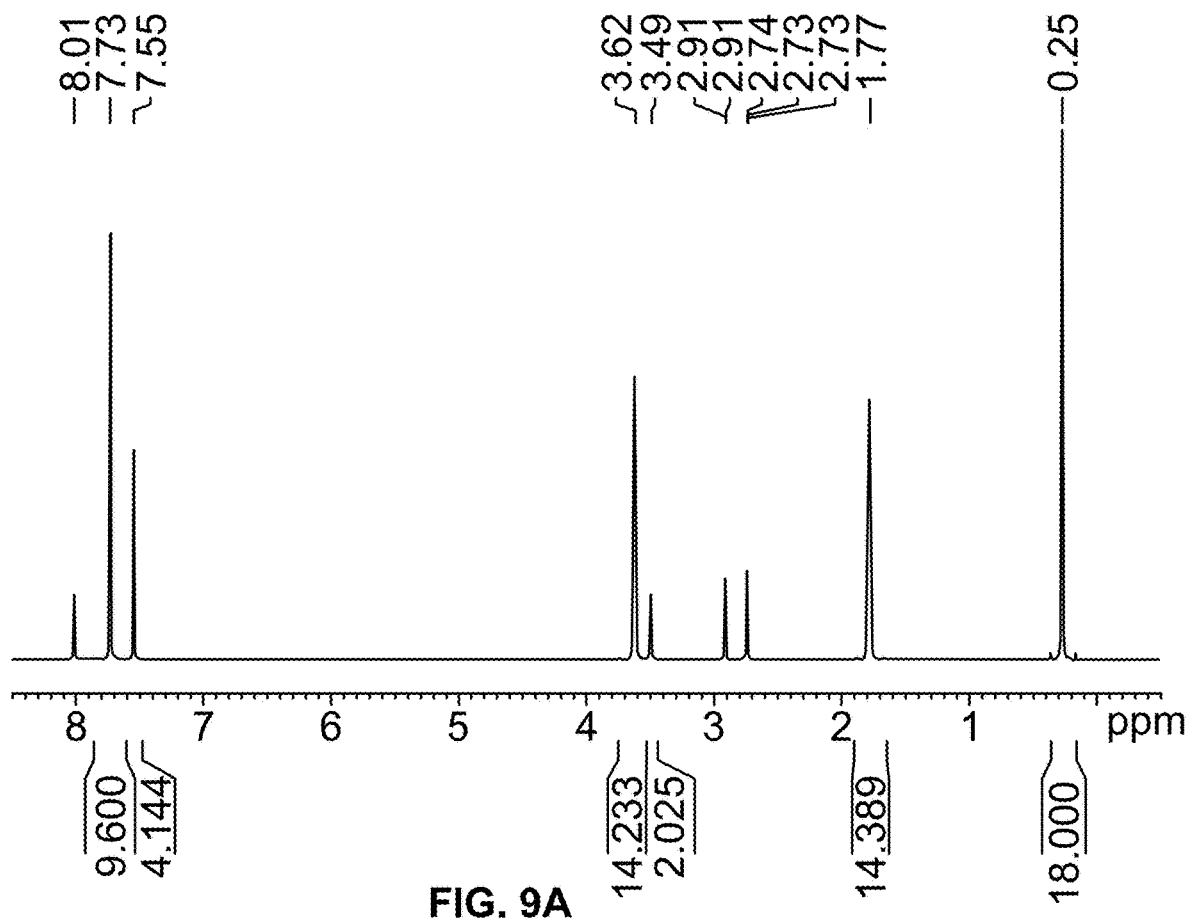
FIG. 9A shows the $^{1}$H-NMR measurement results of a solution of a solid obtained in Example 42.
Figure 9B:
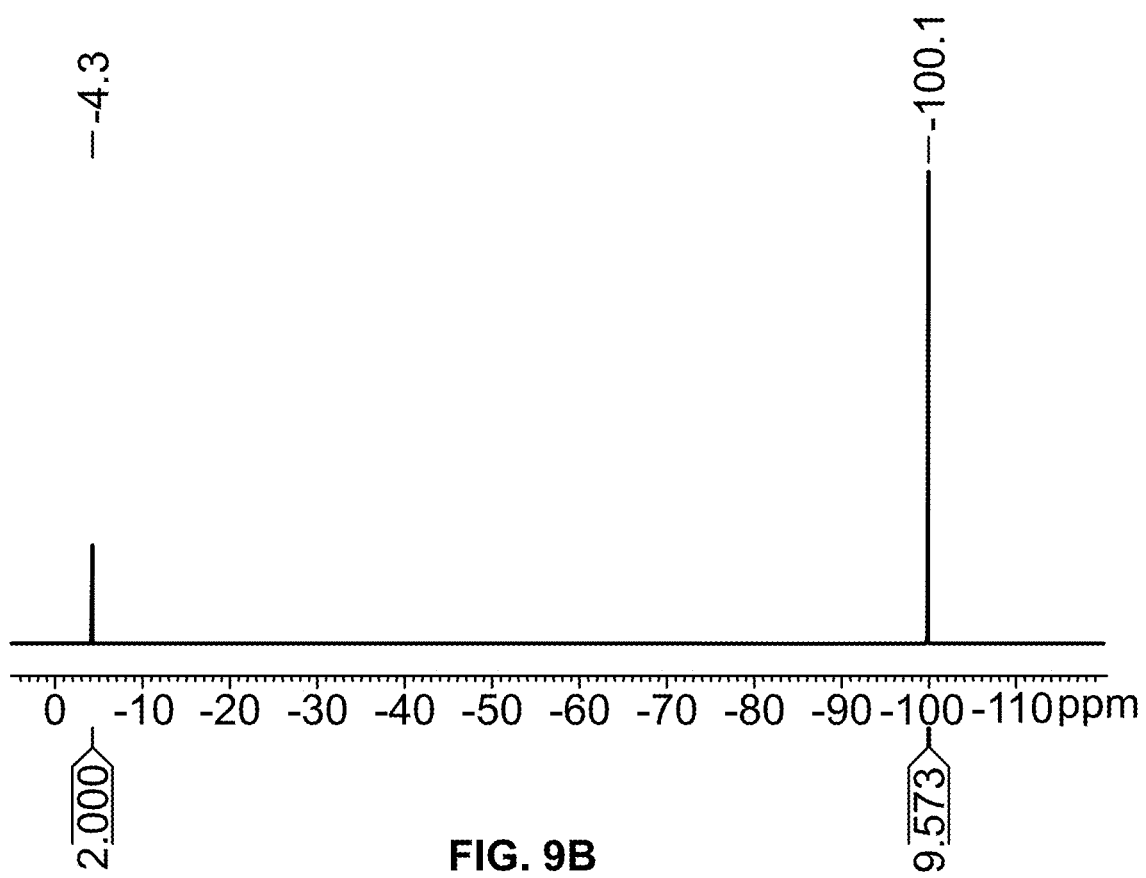
FIG. 9B shows the $^{29}$Si-NMR measurement results of a solution of the solid obtained in Example 42.
Figure 10:
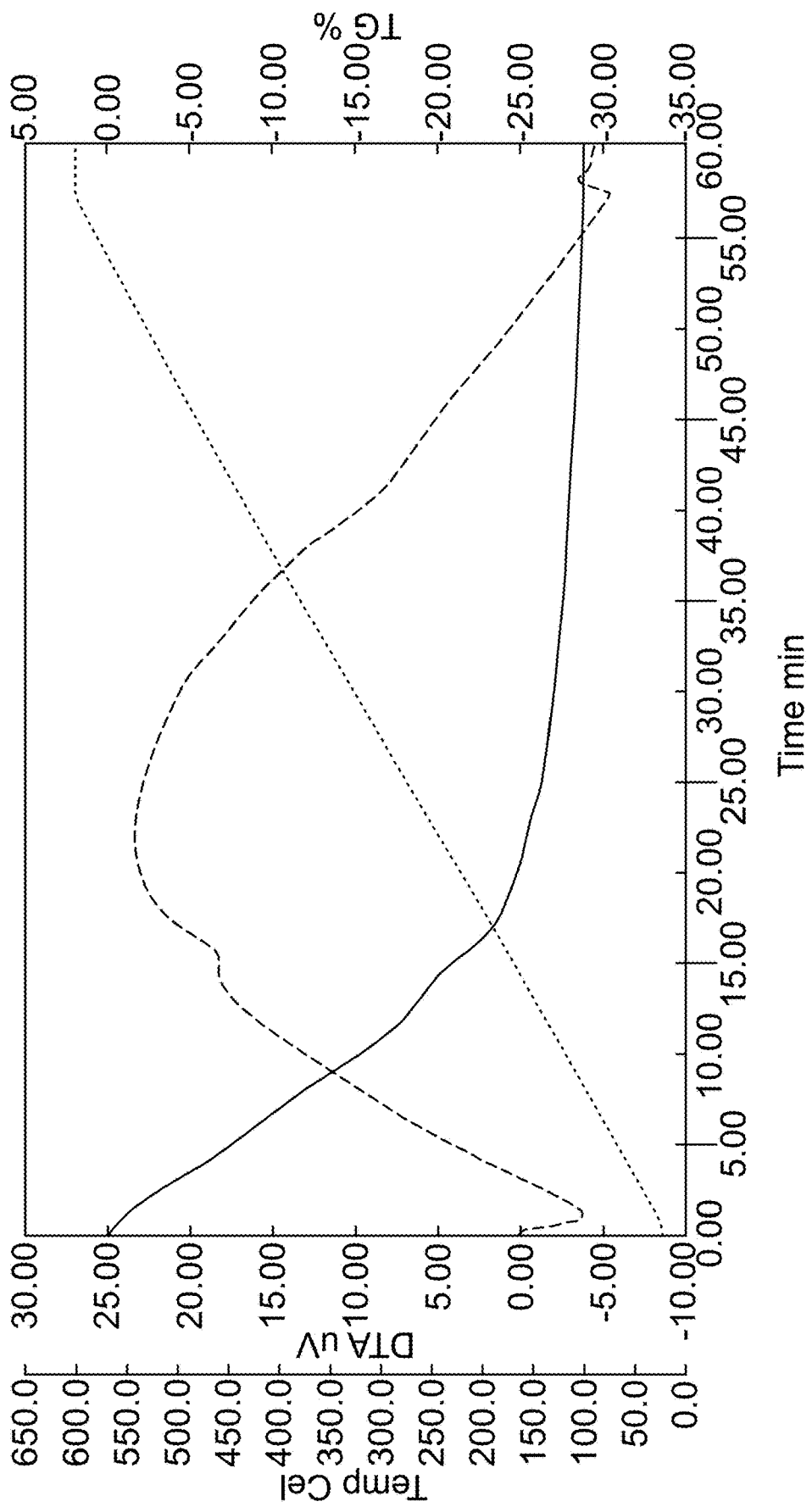
FIG. 10 shows the measurement results of thermogravimetric differential thermal analysis of a solid obtained in Example 42.

0.212 mL (3.35 mmol) of nitric acid was added to a dispersion of 845 mg (0.40 mmol) of Q$_8$(TMA)$_8$·54H$_2$O suspended in 20 mL of THF. The mixture was stirred for 5 minutes, and a suspension was obtained. This suspension was filtered using a filter (washed with 5 mL of THF). The filtrate was distilled under reduced pressure and concentrated to about ⅓ of the original volume thereof. This concentrated solution was further concentrated under a condition of a reduced pressure of 23331 Pa (175 Torr) to isolate a colorless solid (plate-like crystals), which was a composition including 70% by mass of Q$_8$H$_8$ and 2% by mass of H$_2$O. The $^1$H-NMR measurement results of this solid are shown in FIG. 9A ($^1$H-NMR (DMF-d$_7$): 7.73 ppm). Further, the $^{29}$Si-NMR measurement results of this solid are shown in FIG. 9B ($^{29}$Si-NMR (DMF-d$_7$): −100.1 ppm). In addition, the measurement results of thermogravimetric differential thermal analysis of this solid are shown in FIG. 10.

Example 43

0.212 mL (3.35 mmol) of nitric acid was added to a dispersion of 845 mg (0.40 mmol) of $Q_8(TMA)_8 \cdot 54H_2O$ suspended in 20 mL of THF. The mixture was stirred for 5 minutes, and a suspension was obtained. This suspension was filtered using a filter (washed with 5 mL of THF). The filtrate was charged with 3 mL of diethylene glycol dimethyl ether, then concentrated by distilling under reduced pressure to isolate a paste-like solid, which was a composition including 33% by mass of $Q_8H_8$, in a yield of 86% (573 mg) ($^{29}$Si-NMR (Acetone-$d_6$): −100.2 ppm).

Example 44

A paste-like solid, which was a composition including 31% by mass of $Q_8H_8$, was isolated in a yield of 87% (615 mg) ($^{29}$Si-NMR (Acetone-$d_6$): −100.2 ppm) in the same manner as in Example 43, except that the 3 mL of diethylene glycol dimethyl ether was changed to 2 mL of triethylene glycol dimethyl ether.

Example 45

3.04 mL (48.0 mmol) of nitric acid was added to a dispersion of 8.062 g (4.00 mmol) of $Q_8(TMA)_8 \cdot 48.7H_2O$ suspended in 150 mL of THF. The mixture was stirred for 30 minutes, and a suspension was obtained. This suspension was filtered using a filter (washed with 50 mL of THF). The filtrate was charged with 30 mL of diethylene glycol dimethyl ether, then concentrated by distilling under reduced pressure to isolate a paste-like solid, which was a composition including 26% by mass of $Q_8H_8$, in a yield of 95% (8.103 g) ($^{29}$Si-NMR (Acetone-$d_6$): −100.2 ppm).

Example 46

0.212 mL (3.35 mmol) of nitric acid was added to a dispersion of 845 mg (0.40 mmol) of $Q_8(TMA)_8 \cdot 54H_2O$ suspended in 20 mL of THF. The mixture was stirred for 5 minutes, and a suspension was obtained. This suspension was filtered using a filter (washed with 5 mL of THF). The filtrate was charged with 3 mL of diethylene glycol dimethyl ether, then concentrated by distilling under reduced pressure, and recrystallized at room temperature by a poor solvent method (vapor diffusion) to isolate a colorless solid (plate-like crystals), which was a composition including 78.9% by mass of $Q_8H_8$, in a yield of 65% (176 mg) ($^1$H-NMR (DMF-$d_7$): 7.73 ppm, $^{29}$Si-NMR (DMF-$d_7$): −100.0 ppm). Further, it was revealed by single crystal X-ray crystal structure analysis that the obtained crystals had a crystal structure formed with one molecule of $Q_8H_8$ and two molecules of $Et_2O$.

Example 47

Figure 11A:
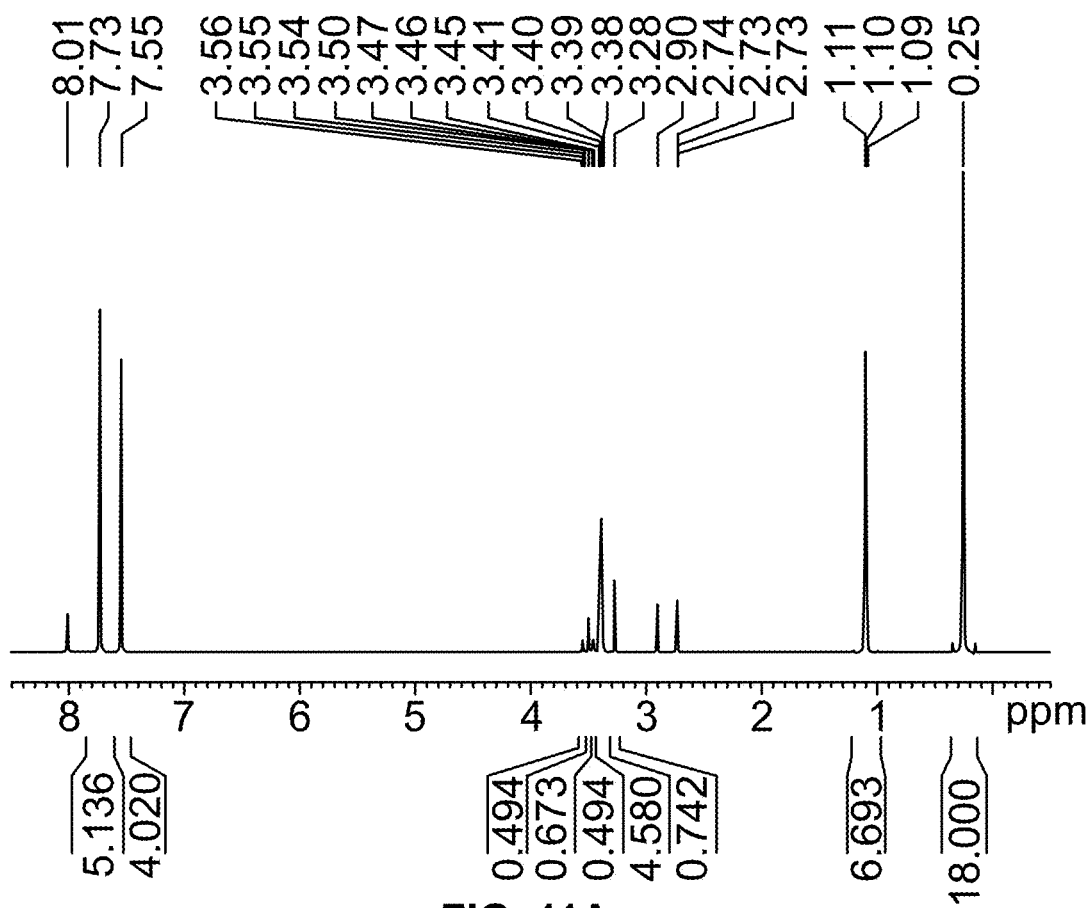
FIG. 11A shows the $^{1}$H-NMR measurement results of a solution of a solid obtained in Example 47.
Figure 11B:
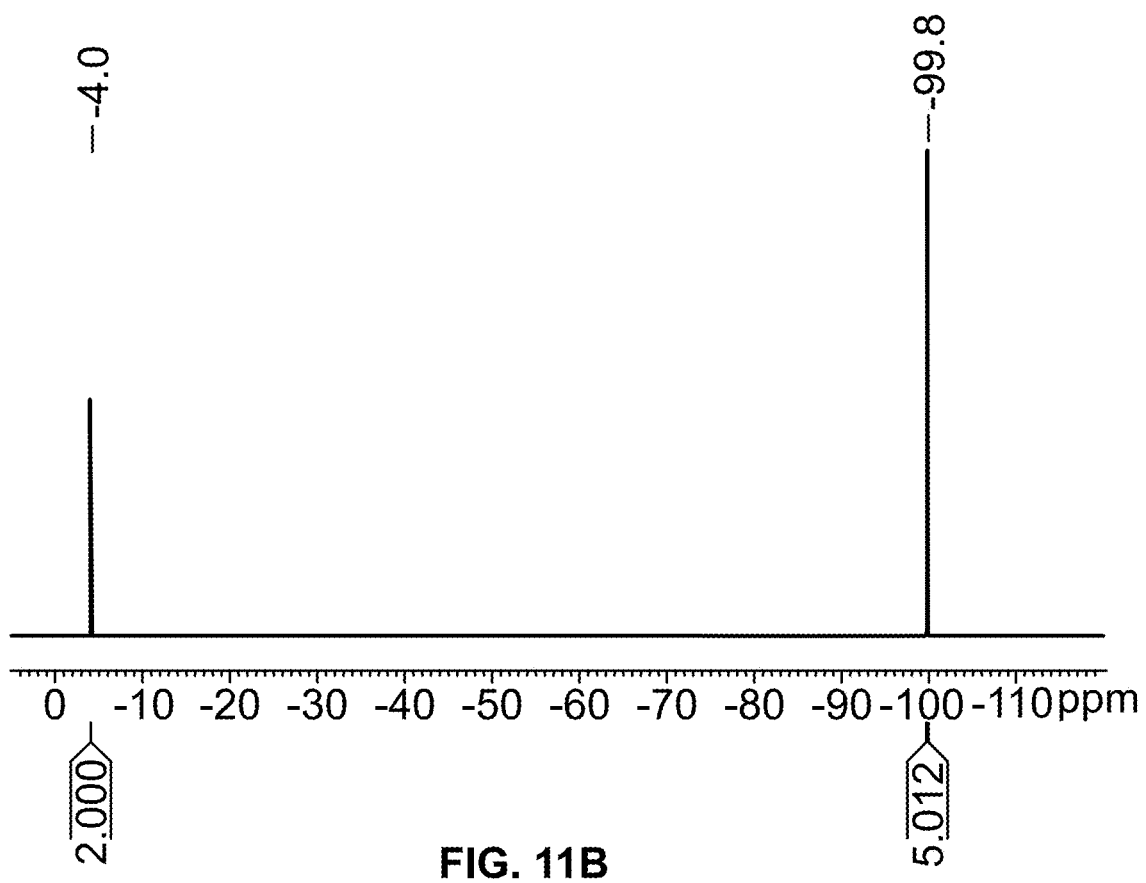
FIG. 11B shows the $^{29}$Si-NMR measurement results of a solution of the solid obtained in Example 47.
Figure 12:
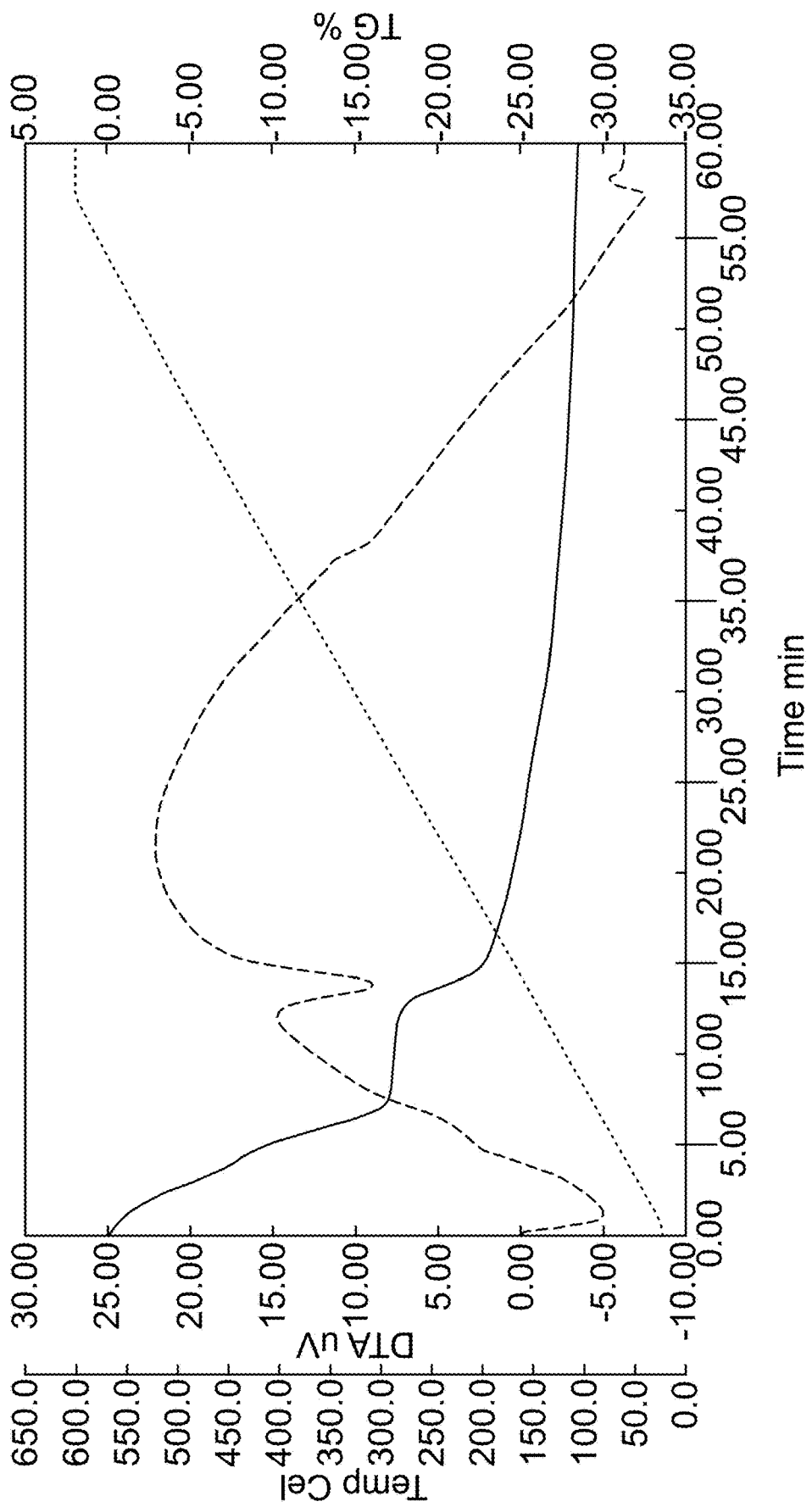
FIG. 12 shows the measurement results of thermogravimetric differential thermal analysis of a solid obtained in Example 47.

2.12 mL (33.5 mmol) of nitric acid was added to a dispersion of 8.062 g (4.00 mmol) of $Q_8(TMA)_8 \cdot 48.7H_2O$ suspended in 200 mL of THF. The mixture was stirred for 30 minutes, and a suspension was obtained. This suspension was filtered using a filter (washed with 50 mL of THF). The filtrate was charged with 30 mL of diethylene glycol dimethyl ether, then concentrated by distilling under reduced pressure, and recrystallized at room temperature by a poor solvent method (vapor diffusion) to isolate a colorless solid, which was a composition including 77% by mass of $Q_8H_8$, in a yield of 80% (2.309 g). The $^1$H-NMR measurement results of this solid are shown in FIG. 11A ($^1$H-NMR (DMF-$d_7$): 7.73 ppm). Further, the $^{29}$Si-NMR measurement results of this solid are shown in FIG. 11B ($^{29}$Si-NMR (DMF-$d_7$): −99.8 ppm). In addition, the measurement results of thermogravimetric differential thermal analysis of this solid are shown in FIG. 12.

Example 48

A solution of 605 mg (4.20 mmol) of Meldrum's acid dissolved in 100 mL of acetonitrile was added to a solution of 1055 mg (0.50 mmol) of $Q_8(TMA)_8 \cdot 54H_2O$ dissolved in 100 mL of ethanol. The mixture was stirred for 5 minutes, and a clear, colorless solution was obtained. 10 g of anhydrous magnesium sulfate was added to this solution, and the mixture was stirred for 10 minutes, and then filtered using a filter to obtain a solution. A silica gel column (ethanol/acetonitrile (1/1 volume ratio) mixed solvent as a developing solvent) of this solution was used to collect the peak portion including the dimerized component of $Q_8H_8$.

Figure 13:
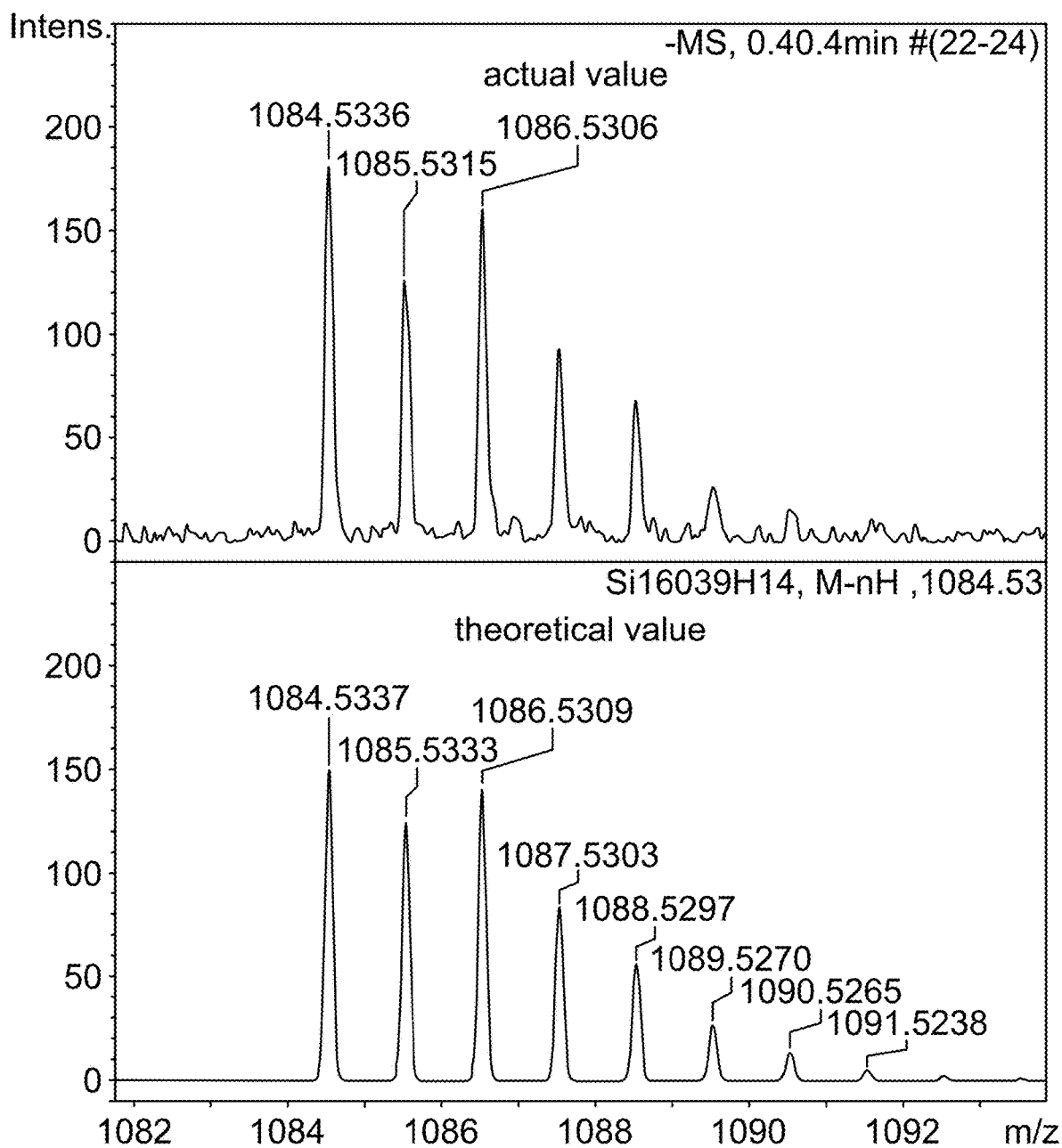
FIG. 13 shows the high-resolution mass spectrometry (TOF-MS) measurement results of a solid obtained in Example 48.

The collected solution was charged with 10 mL of DMAc, then concentrated and recrystallized at 2° C. by a poor solvent method to obtain a colorless solid of $Q_8H_8$ and a dimer of a dehydrated condensation product of $Q_8H_8$ in a yield of 46% (127 mg) ($^{29}$Si-NMR (Acetone-$d_6$): −100.3 ppm, −109.7 ppm). Further, a part of the obtained colorless solid was dissolved in acetonitrile, and high-resolution mass spectrometry (TOF-MS) was performed (theoretical value: $H_{13}O_{39}Si_{16}$[M-H]− 1084.5337, actual value: 1084.5336). The results are shown in FIG. 13.

Example 49

As shown in the following chemical reaction formula, 0.0117 mL (0.18 mmol) of nitric acid was added to a dispersion of 48.5 mg (0.02 mmol) of hexakis(tetraethylammonium)tetracyclo[5.5.1.1$^{3,11}$.1$^{5,9}$]hexa siloxane-1,3,5,7,9,11-hexakis(yloxide)hydrate (CAS No. 73697-41-3: hereinafter sometimes abbreviated as "$Q_6(TEA)_6 \cdot nH_2O$") suspended in 0.8 mL of DMAc. The mixture was stirred for 10 minutes, and a suspension was obtained. This suspension was filtered using a filter (washed with 2 mL of DMAc).

Figure 14:
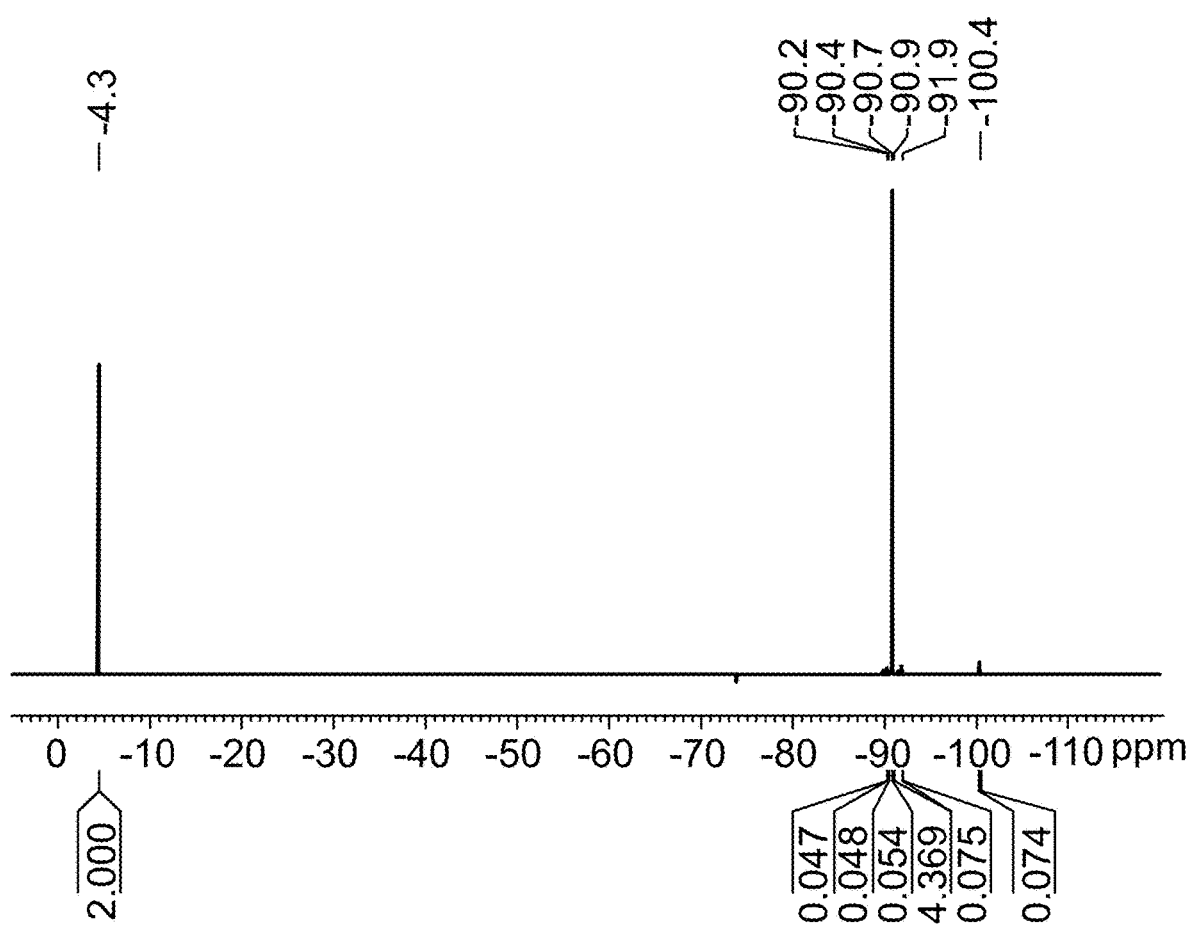
FIG. 14 shows the $^{29}$Si-NMR measurement results of a solution obtained in Example 49.
Figure 15:
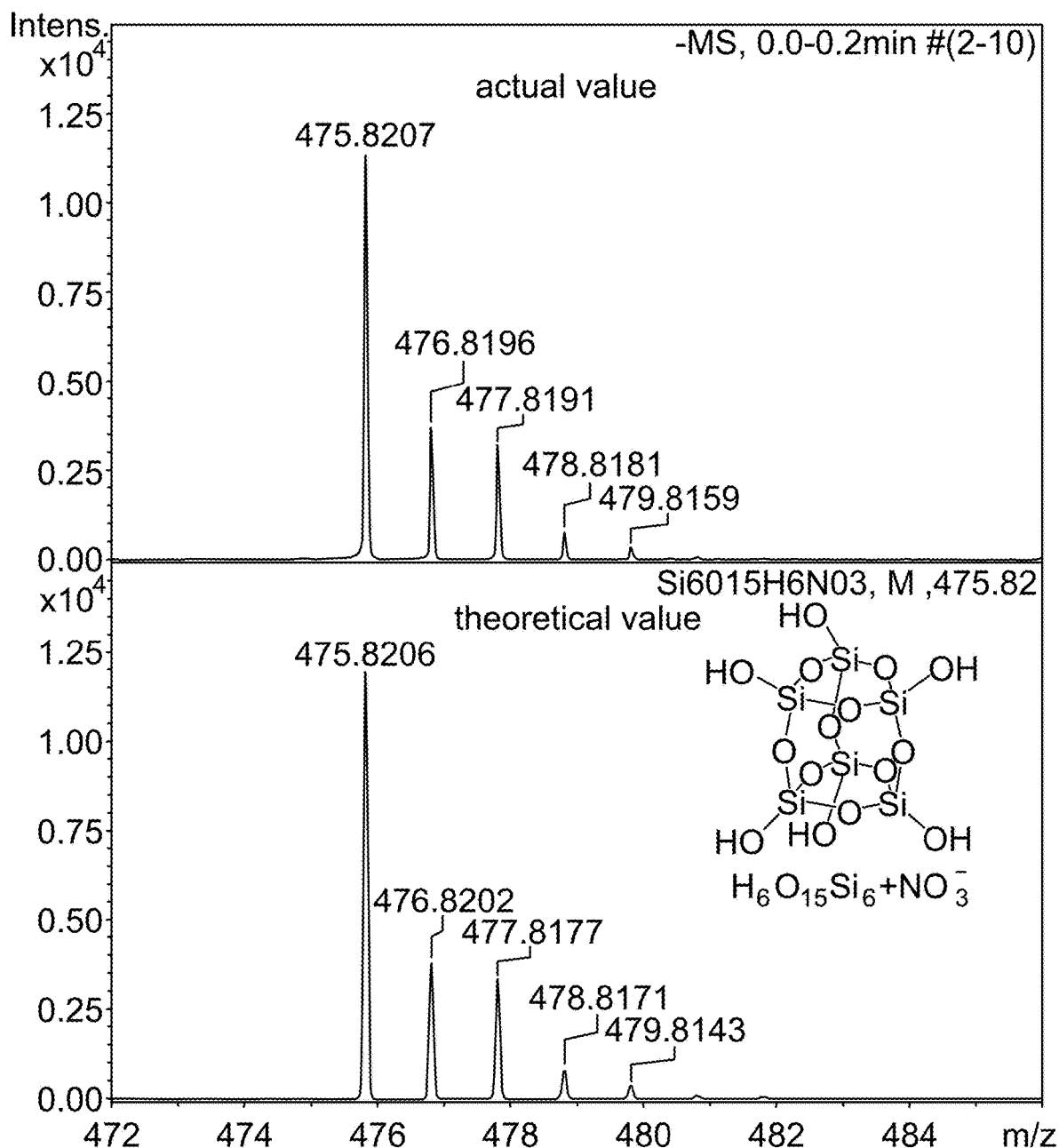
FIG. 15 shows the high-resolution mass spectrometry (TOF-MS) measurement results of the solution obtained in Example 49.

The $^{29}$Si-NMR measurement results of this filtrate are shown in FIG. 14 ($^{29}$Si-NMR (Acetone-$d_6$): −90.9 ppm). Further, the measurement results of high-resolution mass spectrometry (TOF-MS) are shown in FIG. 15 (theoretical value: $H_6NO_{18}Si_6$[M+NO$_3$]− 475.8206, actual value: 475.8207). It was confirmed by various NMR and mass spectrometry that a proton-exchanged basket-shaped hexaol (composition formula $Si_6O_{15}H_6$ (hereinafter sometimes abbreviated as "$Q_6H_6$")) was formed in the solution.

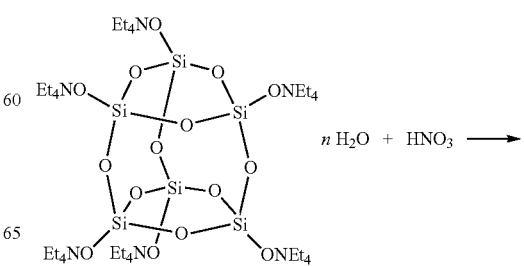

Example 50

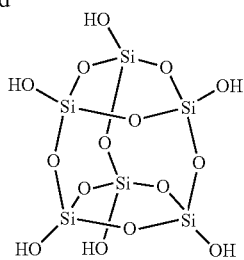

Figure 16A:
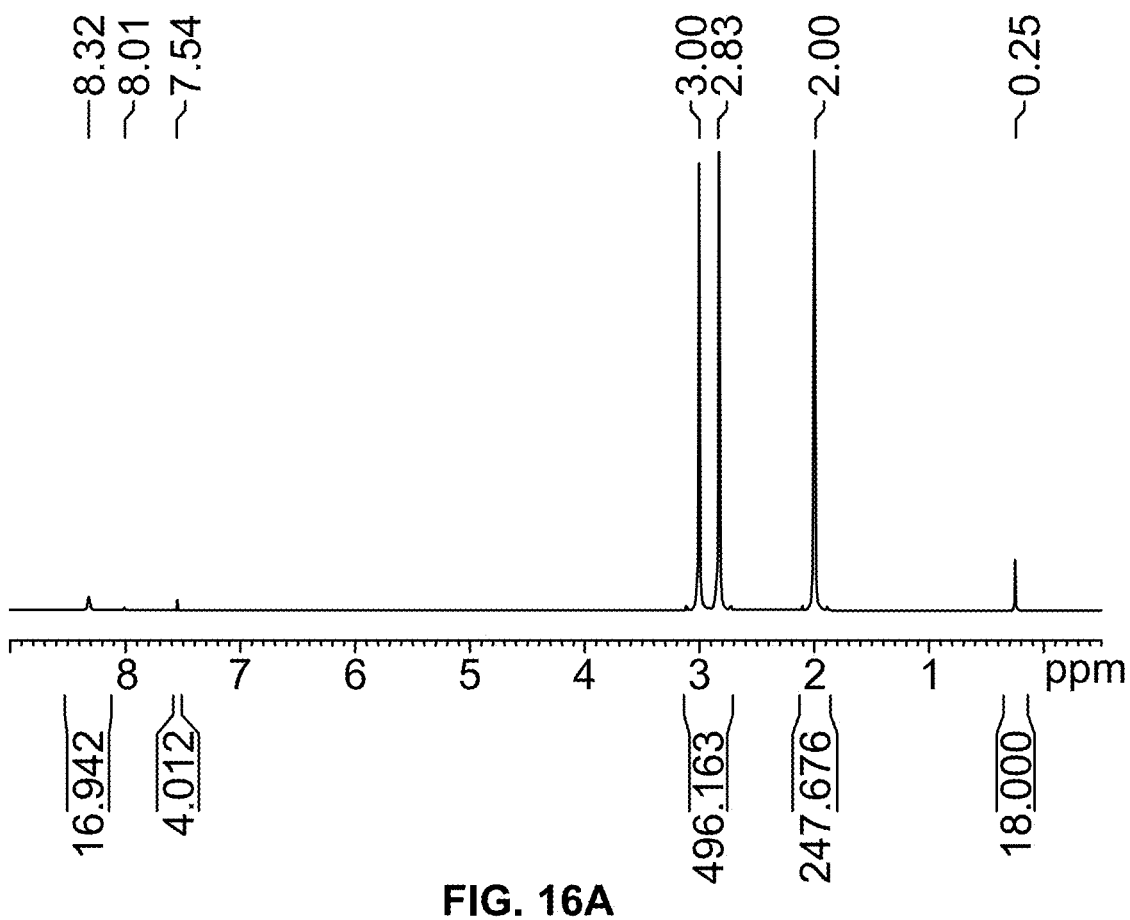
FIG. 16A shows the $^{1}$H-NMR measurement results of a solution of the liquid obtained in Example 50.
Figure 16B:
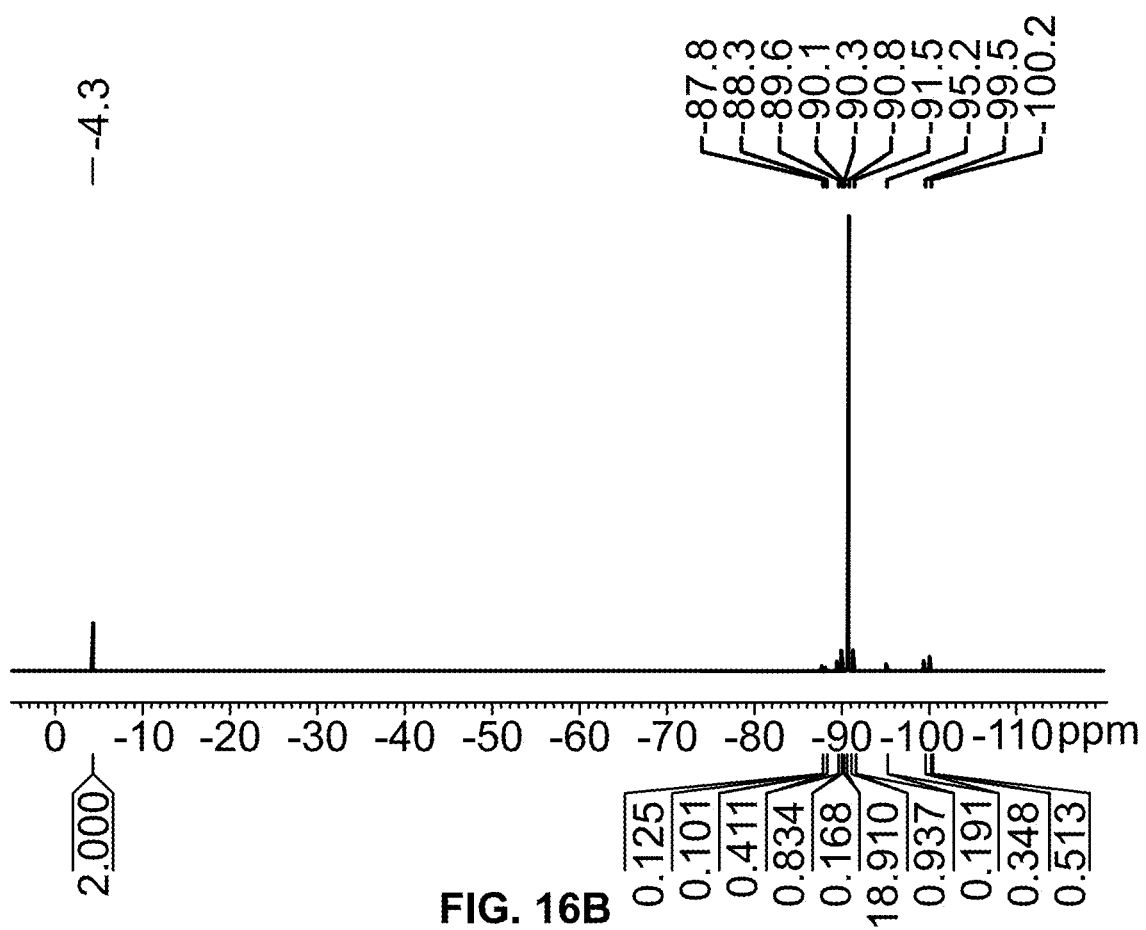
FIG. 16B shows the $^{29}$Si-NMR measurement results of the solution of the liquid obtained in Example 50.

76 mg (0.75 mmol) of sulfuric acid was added to a dispersion of 243 mg (0.10 mmol) of $Q_6(TEA)_6 \cdot 68.8H_2O$ suspended in 8.0 mL of DMAc. The mixture was stirred for 10 minutes, a suspension was obtained. The suspension was filtered using a filter (washed with 1 mL of DMAc). The peak portion corresponding to $Q_6H_6$ was collected from the filtrate by GPC, and concentrated by distilling under reduced pressure to isolate a colorless liquid, which was a composition including 15% by mass of $Q_6H_6$, in a yield of 55% (150 mg). The $^1$H-NMR measurement results of this liquid are shown in FIG. 16A ($^1$H-NMR (DMF-$d_7$): 8.32 ppm). Further, the $^{29}$Si-NMR measurement results of this solid are shown in FIG. 16B ($^{29}$Si-NMR (DMF-$d_7$): −90.8 ppm).

Example 51

76 mg (0.75 mmol) of sulfuric acid was added to a dispersion of 240 mg (0.10 mmol) of $Q_6(TEA)_6 \cdot 68.8H_2O$ suspended in 8.0 mL of DMAc and 12 mL of THF. The mixture was stirred for 10 minutes, and a suspension was obtained. This suspension was filtered using a filter (washed with 3 mL of THF). 1.0 g of silica gel (Silica Gel 60, pH 6 (Kanto Chemical)) was added to the filtrate, and the mixture was stirred for 5 minutes. The silica gel was separated by filtration using a filter (washed with 3 mL of THF). The filtrate was concentrated by distilling under reduced pressure to obtain a colorless liquid, which was a composition including 0.3% by mass of $Q_6H_6$, in a yield of 41% ($^{29}$Si-NMR (Acetone-$d_6$): −91.0 ppm).

Example 52

76 mg (0.75 mmol) of sulfuric acid was added to a dispersion of 243 mg (0.10 mmol) of $Q_6(TEA)_6 \cdot 68.8H_2O$ suspended in 8.0 mL of DMAc and 12 mL of THF. The mixture was stirred for 10 minutes, and a suspension was obtained. This suspension was filtered using a filter (washed with 3 mL of THF). The filtrate was concentrated by distilling under reduced pressure to obtain a colorless liquid, which was a composition including 0.5% by mass of $Q_6H_6$, in a yield of 66% ($^{29}$Si-NMR (Acetone-$d_6$): −91.0 ppm).

Example 53

A colorless liquid, which was a composition including 0.6% by mass of $Q_6H_6$, was obtained in a yield of 81% ($^{29}$Si-NMR (Acetone-$d_6$): −91.0 ppm) in the same manner as in Example 52, except that the amount of THF used was changed from 12 mL to 8 mL.

Example 54

A colorless liquid, which was a composition including 0.5% by mass of $Q_6H_6$, was obtained in a yield of 88% ($^{29}$Si-NMR (Acetone-$d_6$): −91.0 ppm) in the same manner as in Example 52, except that the amount of THF used was changed from 12 mL to 4 mL.

Example 55

76 mg (0.75 mmol) of sulfuric acid was added to a dispersion of 243 mg (0.10 mmol) of $Q_6(TEA)_6 \cdot 68.8H_2O$ suspended in 8.0 mL of DMAc. The mixture was stirred for 10 minutes, and a suspension was obtained. The suspension was filtered using a filter (washed with 1 mL of DMAc). The peak portion corresponding to $Q_6H_6$ was collected from the filtrate by GPC, and concentrated by distilling under reduced pressure to obtain 243 mg of a colorless liquid including $Q_6H_6$. To this colorless liquid, 0.22 mL of diethyl ether was added, and the mixture was cooled at −40° C. to isolate 18 mg of a colorless solid (crystals).

In this way, silanol compounds represented by following formula (F) can be obtained.

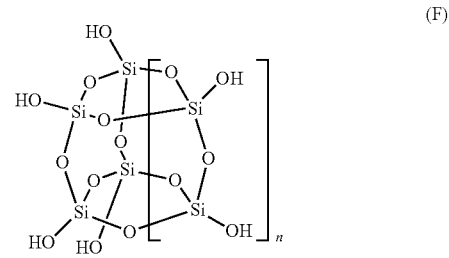

(F)

In the formula, n represents an integer of 1 to 3.

This silanol compound is $Q_6H_6$ when n=1 and is $Q_8H_8$ when n=2.

The silanol compound produced by the production method of the present invention is useful as a raw material and the like of a siloxane compound to be used in a wide range of fields, such as automobiles, construction, electronics, and medicine.

The invention claimed is:

1. A silanol composition comprising a silanol compound represented by following formula (F):

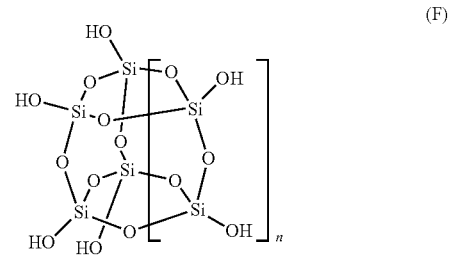

(F)

wherein n represents an integer of 1 to 3, the silanol composition having a crystal structure formed with the silanol compound represented by formula (F) and an amide compound.

2. A solid composition comprising the silanol composition according to claim 1.

3. A composition comprising 30% by mass or more of the silanol composition according to claim 1.

4. A composition comprising 65% by mass or more of the silanol composition according to claim 1.

\* \* \* \* \*